(12) United States Patent
Takeda et al.

(10) Patent No.: US 11,884,185 B2
(45) Date of Patent: Jan. 30, 2024

(54) VEHICLE SEAT

(71) Applicant: TACHI-S CO., LTD., Tokyo (JP)

(72) Inventors: Masakazu Takeda, Tokyo (JP); Keita Myochin, Tokyo (JP); Naoki Toda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 265 days.

(21) Appl. No.: 17/193,128

(22) Filed: Mar. 5, 2021

(65) Prior Publication Data

US 2021/0291702 A1 Sep. 23, 2021

(30) Foreign Application Priority Data

Mar. 18, 2020 (JP) ................................ 2020-047273
Jun. 29, 2020 (JP) ................................ 2020-111802

(51) Int. Cl.
| | | |
|---|---|---|
| *B60N 2/14* | (2006.01) | |
| *B60N 2/30* | (2006.01) | |
| *B60N 2/06* | (2006.01) | |
| *B60N 2/22* | (2006.01) | |

(52) U.S. Cl.
CPC ............... *B60N 2/146* (2013.01); *B60N 2/06* (2013.01); *B60N 2/22* (2013.01); *B60N 2/305* (2013.01); *B60N 2/3011* (2013.01)

(58) Field of Classification Search
CPC ........ B60N 2/005; B60N 2/12; B60N 2/3009; B60N 2/015; B60N 2/0158; B60N 2/14; B60N 2/06; B60N 2/146; B60N 2/22; B60N 2/3011; B60N 2/305

USPC ..... 296/63.13, 65.09, 65.14, 65.01; 297/313, 297/325, 326, 336, 331
See application file for complete search history.

(56) References Cited

U.S. PATENT DOCUMENTS

| | | | | |
|---|---|---|---|---|
| 4,846,520 A | * | 7/1989 | Acuto | B60N 2/12 |
| | | | | 296/65.09 |
| 6,059,345 A | * | 5/2000 | Yokota | B60N 2/06 |
| | | | | 297/331 |
| 6,601,900 B1 | * | 8/2003 | Seibold | B60N 2/36 |
| | | | | 296/65.09 |

(Continued)

FOREIGN PATENT DOCUMENTS

| | | |
|---|---|---|
| CN | 203449974 U | 2/2014 |
| CN | 104379399 A | 2/2015 |

(Continued)

*Primary Examiner* — Dennis H Pedder
(74) *Attorney, Agent, or Firm* — Morgan, Lewis & Bockius LLP

(57) ABSTRACT

A vehicle seat having fewer components and having a pitching mechanism advantageous for strength/rigidity is provided. The vehicle seat includes: a base frame mounted in a vehicle compartment; a cushion frame pin-connected to a first connecting point of the base frame to be capable of a forward leaning operation; a back frame disposed to be capable of a reclining operation with respect to the cushion frame; a front link swingably pin-connected at a proximal end side thereof with a second connecting point of the base frame and slidably connected at a distal end side thereof with the cushion frame; a lock unit for locking the cushion frame to the base frame at a seated position and regulating a pitching operation of the main frame; and a release member for releasing a locked state.

16 Claims, 28 Drawing Sheets

(56) References Cited

U.S. PATENT DOCUMENTS

| | | | |
|---|---|---|---|
| 7,533,936 B2 * | 5/2009 | Ujimoto | B60N 2/045 296/65.13 |
| 11,376,994 B2 * | 7/2022 | Takeda | B60N 2/12 |
| 2012/0153658 A1 * | 6/2012 | Kanda | B60N 2/1615 296/65.13 |
| 2018/0361882 A1 | 12/2018 | Ikeda et al. | |
| 2019/0366886 A1 * | 12/2019 | Sivaraj | B60N 2/3011 |

FOREIGN PATENT DOCUMENTS

| | | | |
|---|---|---|---|
| JP | 2008-189060 A | | 8/2008 |
| JP | 2009-023384 A | | 2/2009 |
| JP | 2009-154681 A | | 7/2009 |
| JP | 2014210546 A | * | 11/2014 |
| JP | 2017-114276 A | | 6/2017 |
| JP | 2018188062 A | * | 11/2018 |

* cited by examiner

VEHICLE SEAT

BACKGROUND

Field

The present disclosure relates to a vehicle seat.

Description of Related Art

Conventionally, a vehicle seat having, for a front seat, a walk-in function (a function of leaning a seat-back forward and further moving the seat forward according to a lever operation, thereby ensuring a large boarding/alighting space between a front seat and a rear seat) is used in order to improve the accessibility to a rear seat in a vehicle that has a second seat and a third seat.

Further, a vehicle seat that enables operation of pitching (movement of leaning a seat back and a seat cushion forward, with relative positions/postures thereof being maintained, thereby ensuring a boarding/alighting space and allowing access to a third-row seat having a child seat mounted thereon), has been proposed so as to prevent the merits of the walk-in function from being impaired when the child seat is mounted on the vehicle seat. Furthermore, as such a vehicle seat, a vehicle seat, for which a force required for seat operation is suppressed and which is improved in operability, has also been proposed (see, e.g., Patent Publication JP2017-114276A).

SUMMARY

However, in a conventional vehicle seat as described above, the mechanism for performing the pitching operation has a four-bar linkage structure including, for example, a front link, a rear link, a base frame, and a main frame. For this reason, the number of components thereof is high, hence the cost increases accordingly. Further, the four-bar linkage structure may be less likely to ensure a strength and a rigidity than other linkage structures.

Under such circumstances, it is an object of the present disclosure to provide a vehicle seat having fewer components and having a pitching mechanism advantageous for achieving strength/rigidity.

In accordance with one aspect of the present disclosure, a vehicle seat, includes:
  a base frame mounted in a vehicle compartment;
  a main frame including a cushion frame pin-connected to a first connecting point of the base frame to be capable of a forward leaning operation and forming a frame of a seat, a back frame disposed to be capable of a reclining operation of reclining with respect to the cushion frame by a reclining mechanism and forming a frame of a backrest, a lock unit for locking the cushion frame to the base frame at a seated position and regulating a pitching operation of the main frame, and a release member for releasing a locked state established by the lock unit, the main frame being configured to assume a forward leaning posture by the pitching operation from a seated posture; and
  a front link swingably pin-connected at a proximal end side thereof with a second connecting point of the base frame and slidably connected at a distal end side thereof with the cushion frame.

With the vehicle seat of the aspect as described above, three links of a base frame (first link), a cushion frame (second link), and a front link (third link), and also a relatively slidable cushion frame-front link mechanism (slide mechanism) form a mechanism which enables the pitching operation of the seat, although the number of rotationally operating links is smaller than that of a conventional four-link mechanism (a mechanism including a front link and a rear link). The vehicle seat adopting a mechanism having a smaller number of rotary links can reduce the cost in accordance with the smaller number of components than that of the conventional mechanism as described above, and tends to improve the strength or the rigidity.

Further, in the vehicle seat of the foregoing aspect, the cushion frame is locked to the base frame using the lock unit, thereby regulating the pitching operation of the main frame, and hence, may be more easily configured to have a structure capable of sufficiently withstanding the impact upon vehicle collision. Such a structure is also applicable to a retractor-equipped type vehicle seat (which is also referred to as a belt-in seat, or the like) required to have proper strength, rigidity, and impact resistance, although depending upon the strength, and the like of other members (the frame itself, and the like), and is widely applicable for that reason.

In the vehicle seat of the aspect, a long hole to which the front link is slidably connected may be formed in the cushion frame.

Another aspect of the present disclosure is a vehicle seat, including:
  a base frame mounted in a vehicle compartment;
  a main frame including a cushion frame connected to a first connecting point of the base frame to be capable of a forward leaning operation and slidably with respect to the base frame and moreover forming a frame of a seat, and a back frame disposed to be capable of a reclining operation of reclining with respect to the cushion frame by a reclining mechanism and forming a frame of a backrest, the main frame being configured to assume a forward leaning posture by a pitching operation from a seated posture;
  a front link swingably pin-connected at a proximal end side thereof with a second connecting point of the base frame and pin-slidably connected at a distal end side thereof with the cushion frame;
  a lock unit for locking the cushion frame to the base frame at a seated position and regulating a pitching operation of the main frame; and
  a release member for releasing a locked state established by the lock unit.

With the vehicle seat of the aspect as described above, three links of a base frame (first link), a cushion frame (second link), and a front link (third link), and also a relatively slidable base frame-cushion frame mechanism (slide mechanism) form a mechanism enabling the pitching operation of the seat, although the number of rotationally operating links is smaller than that of a conventional four link mechanism (a mechanism including a front link and a rear link). The vehicle seat adopting a mechanism having a smaller number of rotary links can reduce the cost in accordance with the smaller number of components than that of the conventional mechanism as described above, and tends to improve the strength or the rigidity.

Further, in the vehicle seat of the foregoing aspect, the cushion frame is locked to the base frame using the lock unit, thereby regulating the pitching operation of the main frame, and hence, may be more easily configured to have a structure capable of sufficiently withstanding the impact upon vehicle collision. Such a structure is also applicable to a retractor-equipped type vehicle seat (which is also referred to as a belt-in seat, or the like) required to have proper strength, rigidity, and impact resistance, although depending upon the strength, and the like of other members (the frame itself, and the like), and is widely applicable for that reason.

In the vehicle seat of the aspect, a long hole for slidably connecting the cushion frame to the base frame may be formed in the cushion frame.

In the vehicle seat of the aspect, a stopper for regulating a movable range of the cushion frame may be disposed at the base frame.

In the vehicle seat of the aspect, the stopper may be disposed at a position such that a movable range of the cushion frame is regulated within a range in which the distal end of the front link does not cross a straight line connecting the first connecting point and the second connecting point.

In the vehicle seat of the aspect, the stopper may be disposed at a position such that the movable range of the cushion frame is regulated at a point at which the distal end of the front link crosses a straight line connecting the first connecting point and the second connecting point.

In the vehicle seat of the aspect, the cushion frame may be arranged on an inner side of the base frame.

In the vehicle seat of the aspect, the first connecting point of the base frame may be set upward of the second connecting point.

In the vehicle seat of the aspect, the lock unit may be arranged at a position rearward and downward of the first connecting point.

The vehicle seat of the aspect may further include a slide rail for supporting the base frame slidably in a forward/backward direction.

In the vehicle seat of the aspect, an upper rail forming the slide rail may be longer than a longitudinal length of the base frame.

In accordance with the present disclosure, it becomes possible to provide a vehicle seat with fewer components and having a pitching mechanism advantageous for strength/rigidity.

DETAILED DESCRIPTION

Figure 1:
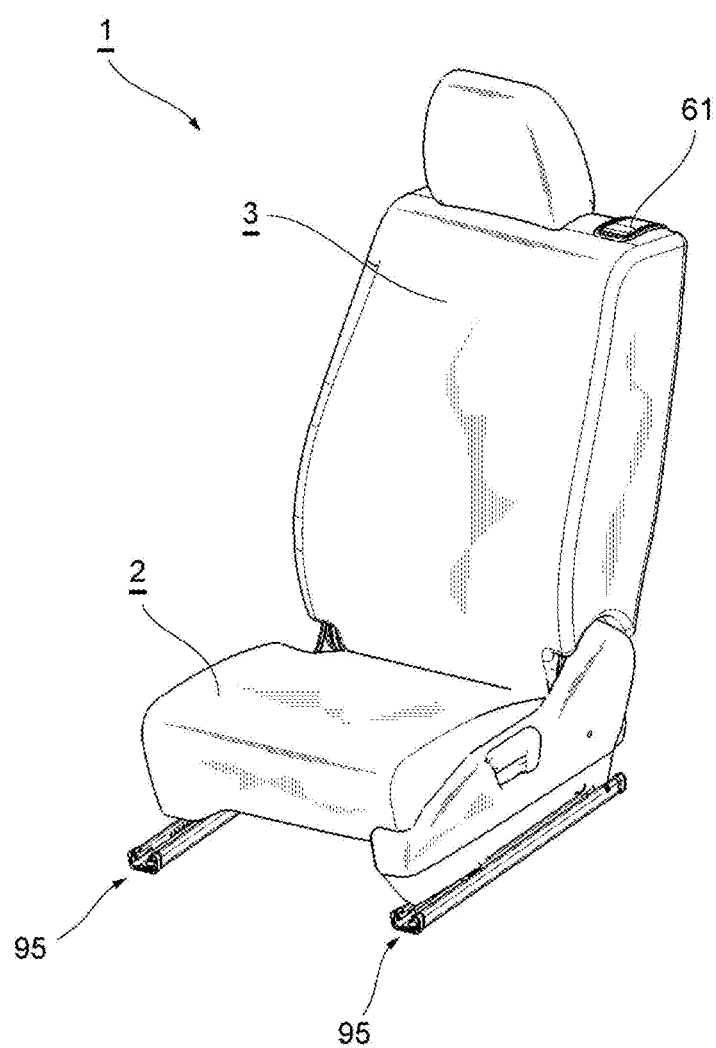
FIG. 1 is a perspective view of a vehicle seat in one embodiment of the present disclosure.

Below, a preferable embodiment of a vehicle seat in accordance with the present disclosure will be described in details with reference to the accompanying drawings (see FIGS. 1 to 14).

First Embodiment

A vehicle seat 1 includes a seat cushion (seat) 2 arranged on a floor panel of a vehicle, and a seat back (backrest) 3 reclinable with respect to the seat cushion 2. The seat cushion 2 and the seat back 3 are each a seat member forming the vehicle seat 1, and include a cushion material including, for example, a foamed product. Below, a description will be given to an example in which the present disclosure is applied to the vehicle seat 1 of a car having a second seat and a third seat, and having a walk-in function in the front seat for improving the accessibility to a rear seat.

The vehicle seat 1 of the present embodiment includes a base frame 90, a main frame 10, a front link 40, a lock unit 50, a lock release member 60, and the like.

Figure 2:
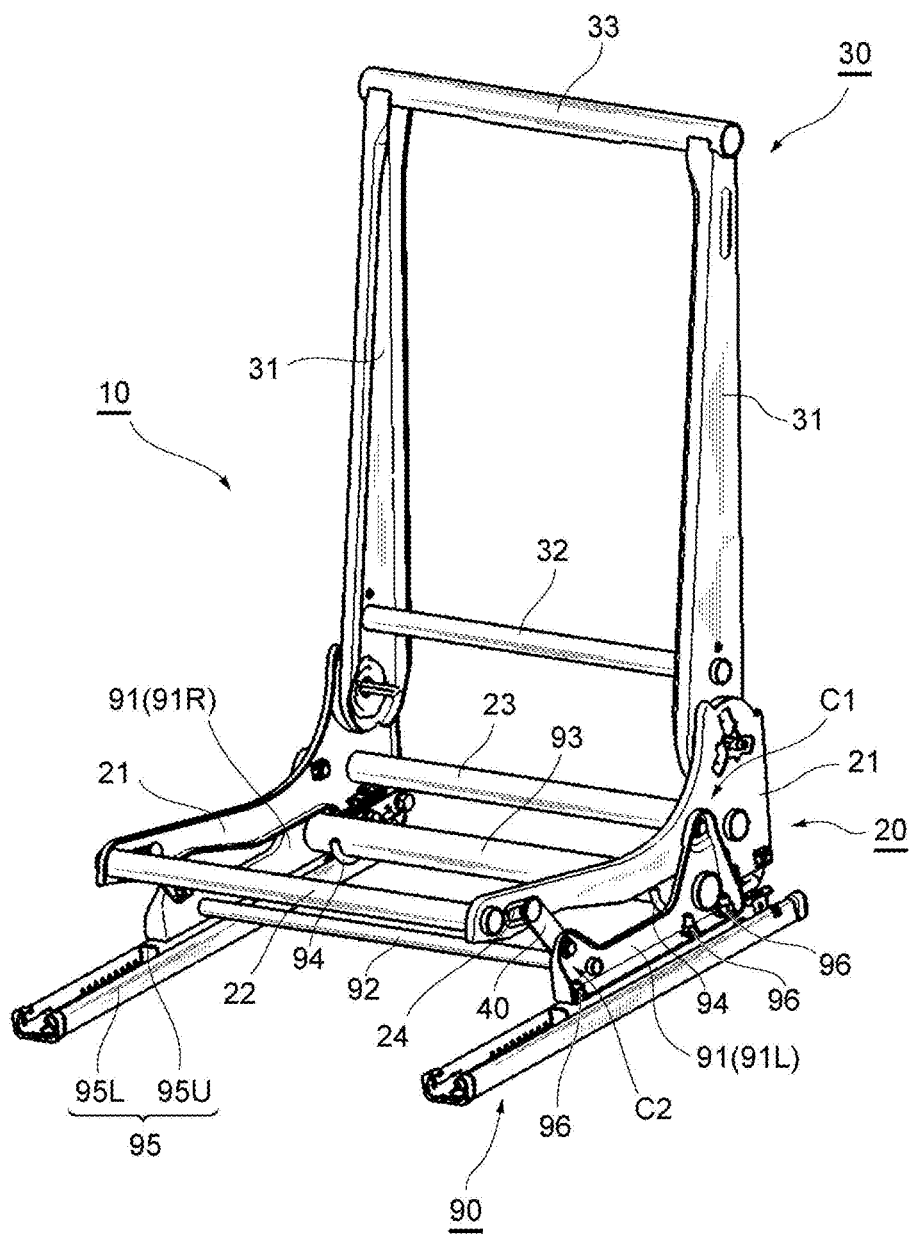
FIG. 2 is a perspective view showing an overall configuration of an internal frame, and the like forming the vehicle seat.
Figure 3:
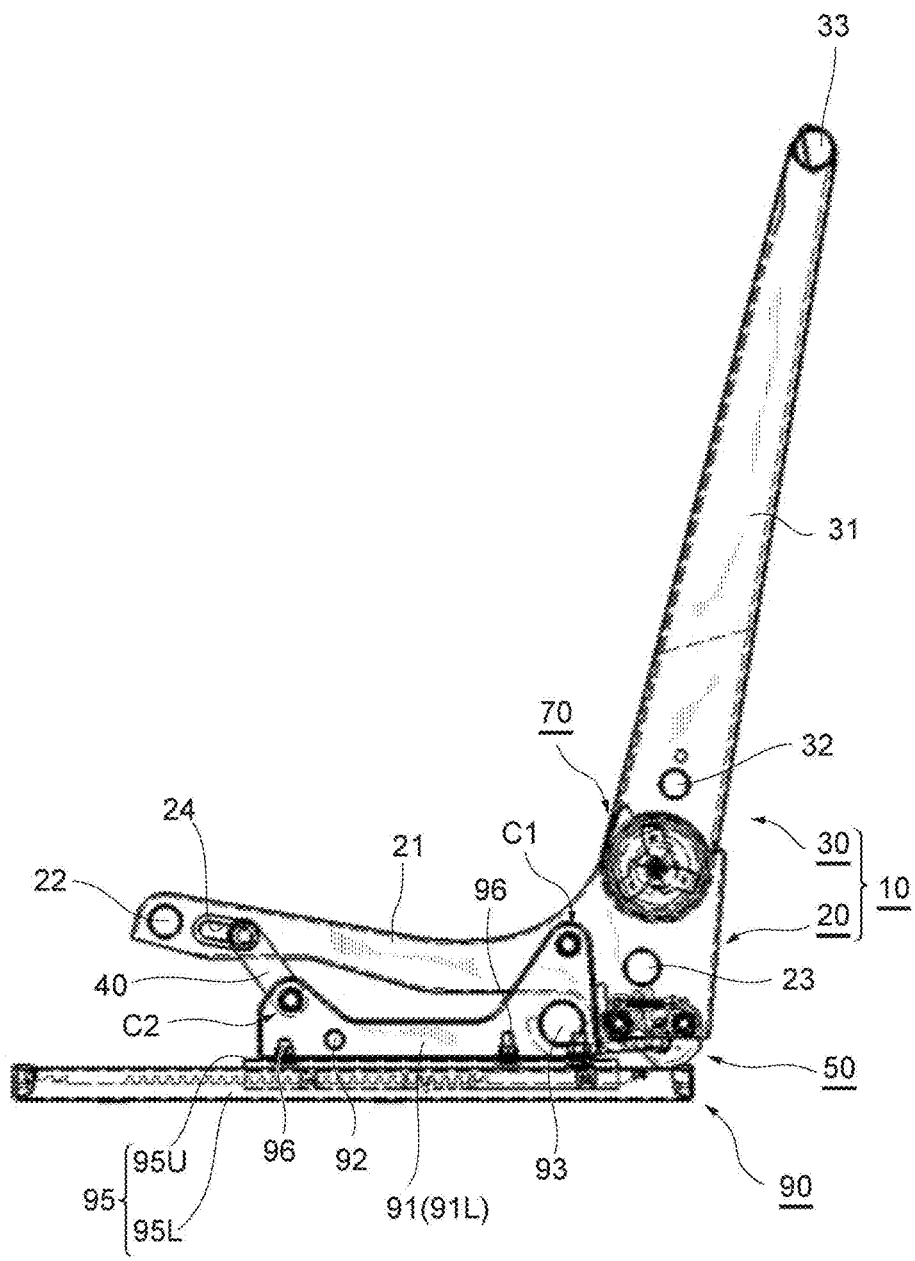
FIG. 3 is a left-hand side view showing an overall configuration of an internal frame, and the like forming the vehicle seat.
Figure 4:
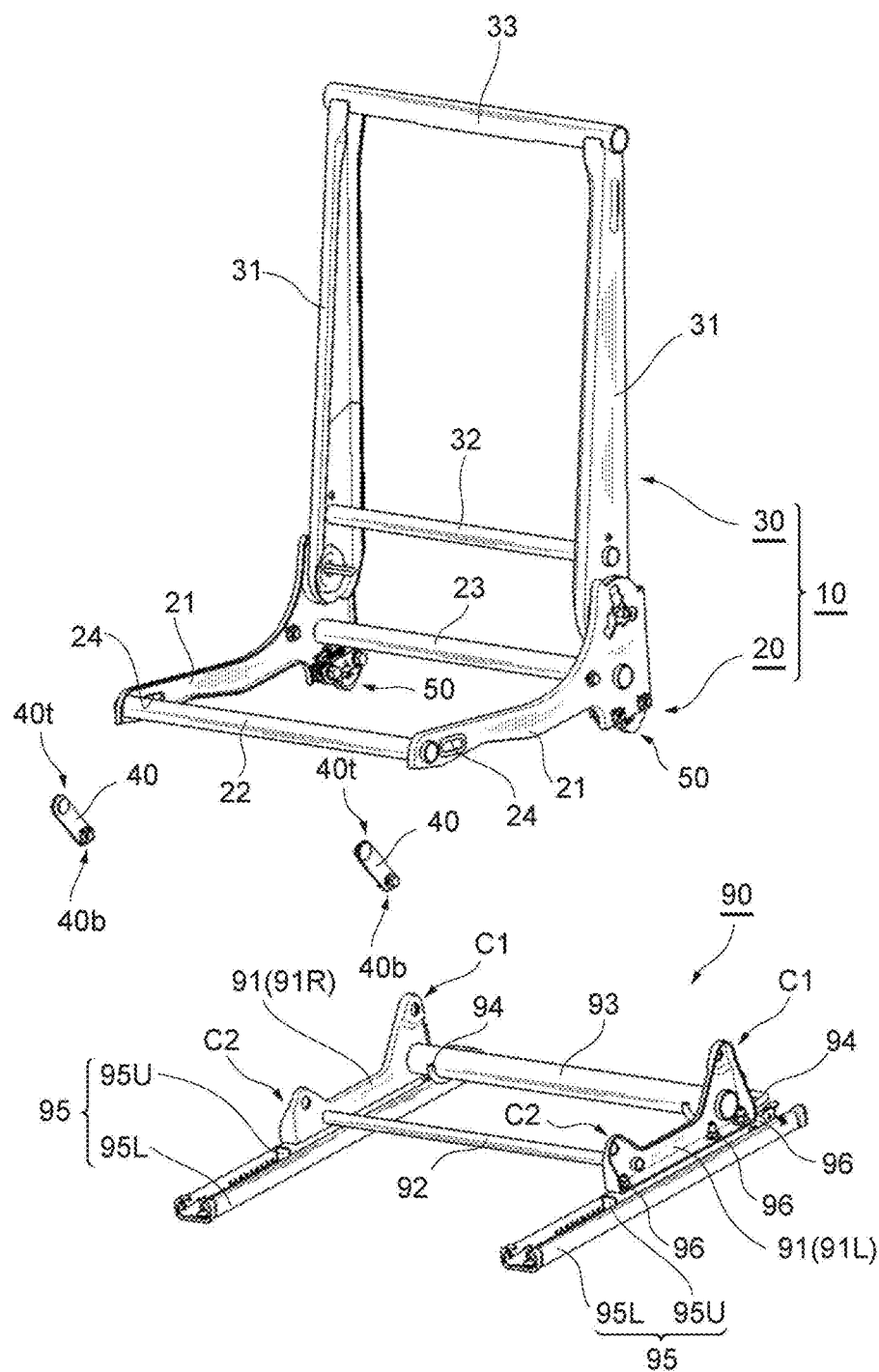
FIG. 4 is an exploded perspective view of an internal frame, and the like forming the vehicle seat.
Figure 5:
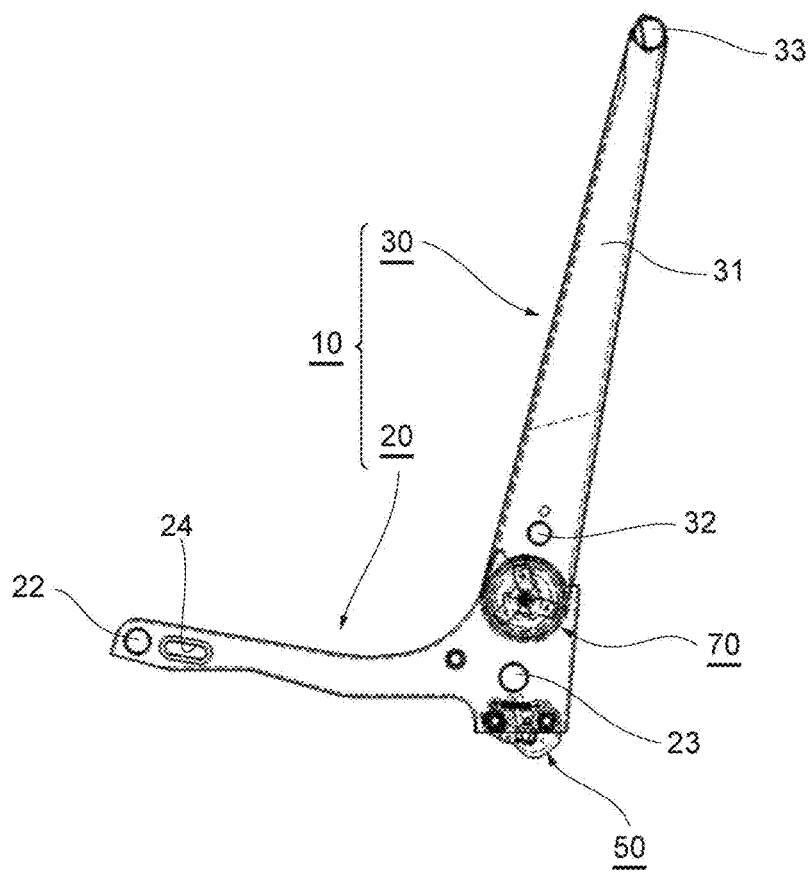
FIG. 5 is a left-hand side view showing an internal main frame (cushion frame and back frame) forming the vehicle seat.
Figure 6:
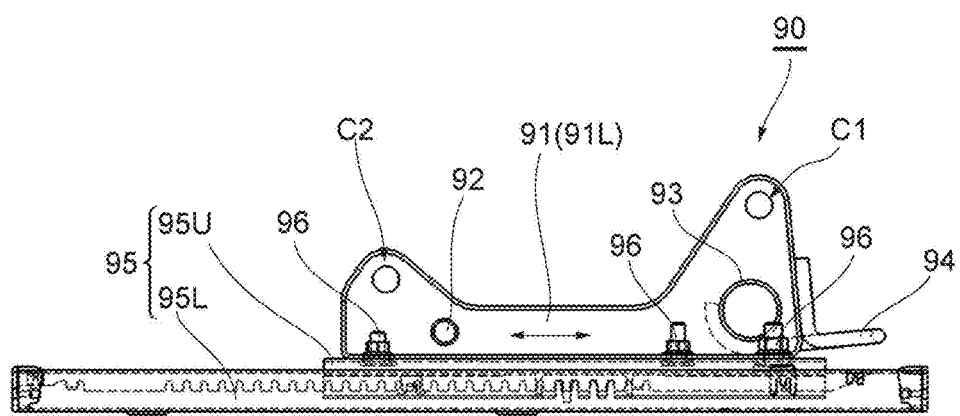
FIG. 6 is a left-hand side view showing internal base frame and slide rail forming the vehicle seat.
Figure 7:
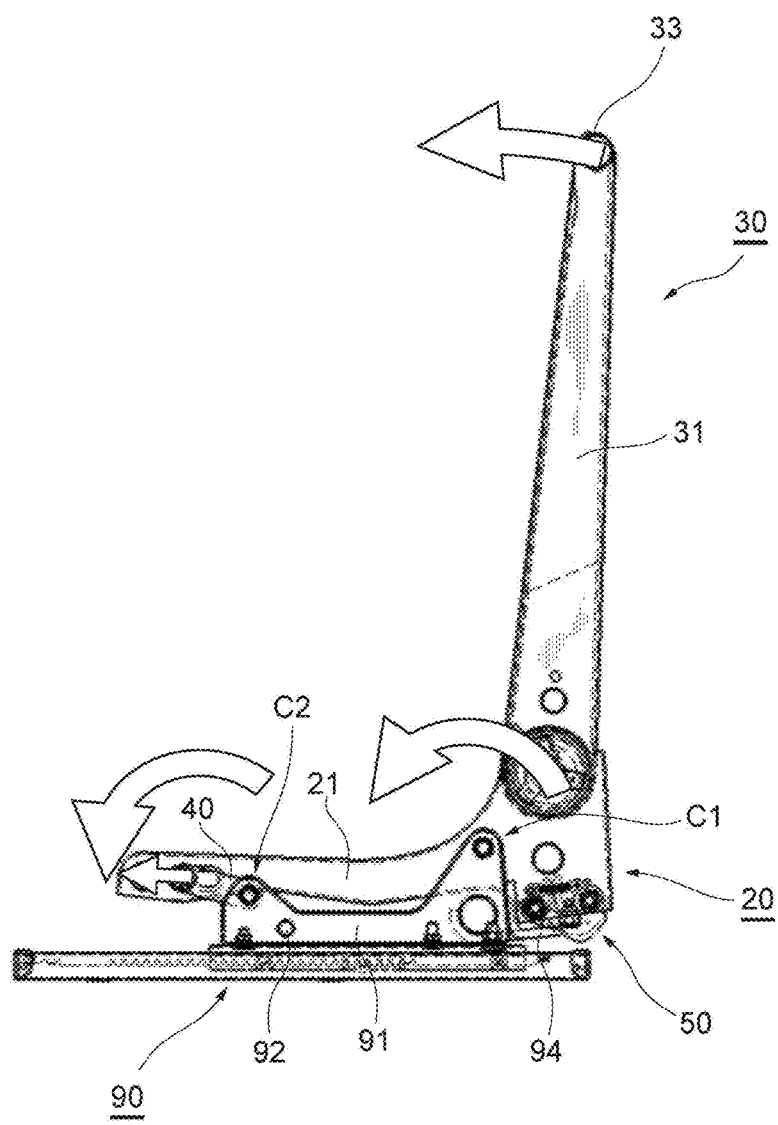
FIG. 7 is a left-hand side view showing a state of the overall frame in a normal time (in sitting)
Figure 8:
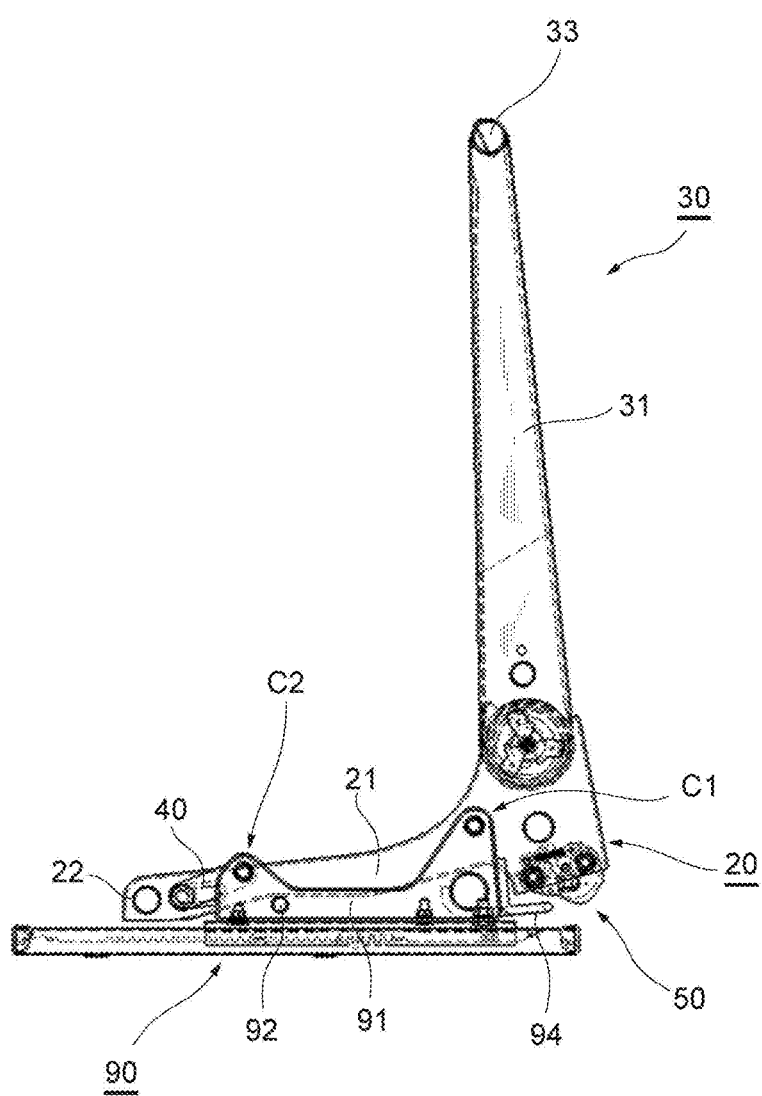
FIG. 8 is a left-hand side view showing a state of the overall frame upon a forward pitching operation.

The base frame 90 is a frame mounted at the floor part of a vehicle compartment, and including the main frame 10 mounted thereon (see FIG. 2, and the like). The base frame 90 of the present embodiment includes a riser 91, connecting members 92 and 93, a striker 94, and a slide rail 95.

The riser 91 includes a pair of left and right members forming the frames on the opposite sides of the base frame 90. To a back connecting point (first connecting point) C1 and a front connecting point (second connecting point) C2 of each of the pair of risers 91 (91L and 91R), (the cushion frame 20 forming a part of) the main frame 10, and the front link 40 are pin-connected, respectively, swingably in the forward/backward direction (see FIG. 3 or the like). The pair of left and right risers 91 are fastened to left and right upper rails 95U by fasteners 96 including, for example, a bolt/nut, respectively (see FIG. 3, or the like), and can slide back and forth along the lower rails 95L (see FIG. 4, or the like). In the present embodiment, the riser 91 is mounted at a position such that the front end and the rear end of the upper rail 95U each protrude from the riser 91 (see FIG. 6, or the like).

The connecting members 92 and 93 are the members for connecting the left and right risers 91 (91L and 91R). In the present embodiment, the front parts of the risers 91 are connected by a cylindrical connecting member 92, and the rear part thereof is connected by a cylindrical connecting member 93 with a larger diameter than that (see FIG. 4, or the like). The connecting member 92 functions as a stopper for regulating the region in which the leaning operation of the cushion frame 20 is allowed (see FIGS. 7, 8, and the like).

The striker 94 is a member for being engaged with the lock unit 50 in a sitting posture, and thereby keeping the pitching operation of the cushion frame 20 in a locked state. In the present embodiment, a partially curved bar-shaped member is adopted, and a part thereof is welded and fixed to the riser 91 (see FIG. 13), and a still other part thereof is welded and fixed to the connecting member 93 (see FIG. 14).

The slide rail 95 enables the vehicle seat 1 to slide in the forward/backward direction. The slide rails 95 of the present embodiment include a pair of left and right lower rails 95L mounted at the floor panel in the vehicle compartment, and upper rails 95U respectively slidable on the lower rails 95L (see FIG. 2, or the like). The length of the upper rail 95U is larger than the longitudinal length of the riser 91 (see FIG. 6, or the like). The riser 91 is mounted onto the upper rail 95U by the fastener 96 including, for example, a bolt and a nut.

The main frame 10 of the vehicle seat 1 includes the cushion frame 20, the back frame 30, the lock unit 50, and the lock release member 60. The cushion frame 20 is the frame of the seat cushion 2 of the vehicle seat 1, and the back frame 30 is the frame of the seat back 3 of the vehicle seat 1.

The cushion frame 20 includes a pair of left and right frame side parts 21, and connecting members 22 and 23 for connecting both the frame side parts 21. In the present embodiment, the front parts of both the frame side parts 21 are connected by the cylindrical connecting member 22, and the rear parts thereof are connected by the cylindrical connecting member 23, thereby forming a generally rectangular frame (see FIG. 4, or the like). Further, in the present embodiment, the frame side part 21 is mounted on the inner side surface of the riser 91, or the frame side part 21 is mounted on the inner side of the front link 40 mounted on the inner side surface of the riser 91, so that the cushion frame 20 is arranged on the inner side of the base frame 90 (see FIGS. 11, 12, and the like). When a structure in which the cushion frame 20 is thus arranged on the inner side of the base frame 90 is adopted, there are produced advantages that (1) a side table can be set with ease, (2) the width dimension between the slide rails 95 increases, resulting in an improvement of the comfortableness in inserting legs in a rear seat, and (3) the width dimension between the slide rails 95 increases, resulting in advantage in holding the strength.

Further, the cushion frame 20 is pin-connected and swingably supported to the back connecting point (first connecting point) C1 of the riser 91 forming the base frame 90. Further, a long hole 24 extending in the forward/backward direction is mounted at the front part (e.g., around a little behind the portion at which the connecting member 22 is mounted) of the frame side part 21 (see FIG. 5 or the like). To the long hole 24, a distal end 40*t* of the front link 40 is mounted slidably (see FIG. 9, or the like). The long hole 24 shown in the present embodiment has a linearly extending shape (generally rectangular shape), and, other than this, may also have a circular arc shape curving along an arc, or the like.

The back frame 30 includes a pair of left and right frame side parts 31, and the connecting members 32 and 33 connecting both the frame side parts 31. In the present embodiment, the vicinities of the lower parts of both the frame side parts 31 are connected by the cylindrical connecting member 32, and the upper parts thereof are connected by the cylindrical connecting member 33, thereby forming a frame in a generally rectangular shape (see FIG. 2, or the like). The back frame 30 thus formed is connected to each of the left and right frame side parts 21 via a reclining mechanism 70, and is mounted to be capable of a prescribed reclining operation by the reclining mechanism 70. Incidentally, the reclining mechanism 70 herein used itself may be the known one (see FIG. 9, or the like).

The front links 40 are a pair of left and right members forming a four-bar slider mechanism for enabling the pitching operation of the main frame (the cushion frame 20 and the back frame 30) 10 (see FIG. 2, or the like). The front link 40 is pin-connected at the proximal end 40*b* side, and is supported swingably to the front connecting point (second connecting point) C2 of the riser 91 forming the base frame 90. The distal end 40*t* side of the front link 40 is slidably connected to the long hole 24 disposed in the frame side part 21 of the cushion frame 20 (see FIG. 3, or the like).

The lock unit 50 is a device for locking the cushion frame 20 to the base frame 90 in a seated position, and regulating the pitching operation of the main frame 10. The lock unit 50 of the present embodiment is mounted to the lower side of the rear part of the cushion frame 20 engageably and disengageably with and from the striker 94 fixed at the base frame 90 (see FIGS. 9, 10, and the like). When the lock unit 50 is placed at a position behind and below the back connecting point C1, it may be easy to perform an operation of leaning the main frame 10 while performing an operation of releasing the locked state of the lock unit 50. The lock unit 50 of the present embodiment itself may be the known one. Incidentally, a reference numeral 51 represents a base serving as the base of the lock unit 50; a reference numeral 54, an interface for transferring the movement; and a reference numeral 55, a cam forcing spring (see FIG. 12).

The lock release member 60 is a member for releasing the locked state by the lock unit 50, and includes a seat side releasing lever 61 and a cable (not shown).

The cable is connected at one end thereof to a cable connecting piece of a stopper 53 (not shown), and is connected at the other end thereof to the seat side releasing lever 61, and is wired in the inside of the seat back 3, or the like. When an occupant, or the like operates the seat side releasing lever 61, the cable is pulled, and the stopper 53 is rotated in the counterclockwise direction in the drawing (see FIG. 12, or the like).

Figure 15:
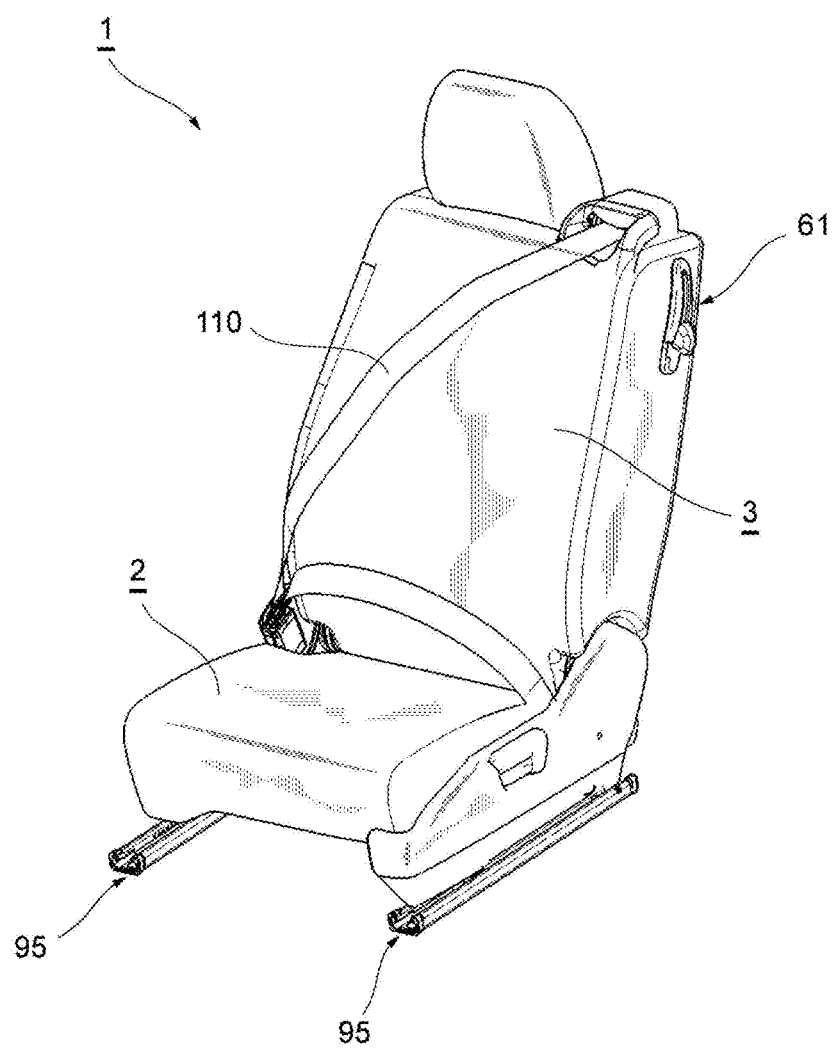
FIG. 15 is a perspective view of a vehicle seat in another embodiment of the present disclosure.

The seat side releasing lever 61 is a lever to be operated for releasing the locked state by the lock unit 50, and the operation of the seat side releasing lever 61 by an occupant, or the like enables the pitching operation of the vehicle seat 1. The arrangement of the seat side releasing lever 61 has no particular restriction, and can be appropriately set according to the structure of the vehicle seat 1, or the like. For example, the seat side releasing lever 61 may be arranged at the shoulder part of the seat back 3 (see FIG. 1), or may be arranged at the upper part of the side part of the seat back 3 (see FIG. 15).

Subsequently, the operation of the lock unit 50 will be described in brief with reference to the accompanying drawings (see FIG. 12, or the like), and in addition, the posture of the vehicle seat 1 will also be described.

Figure 12:
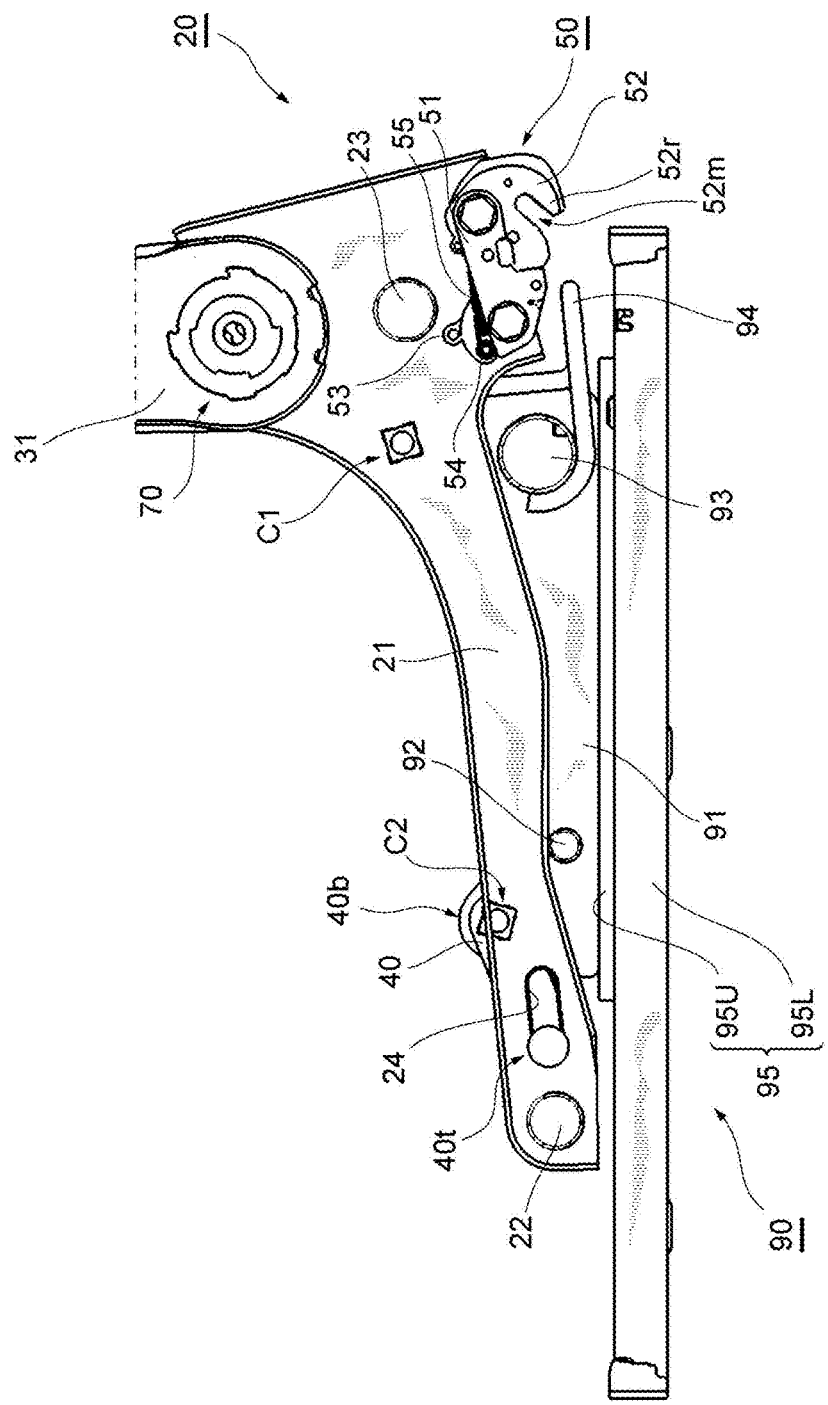
FIG. 12 is an enlarged view of the cushion frame, the base frame, and the like as viewed from the inside of the vehicle seat upon performing a forward pitching operation.
Figure 13:
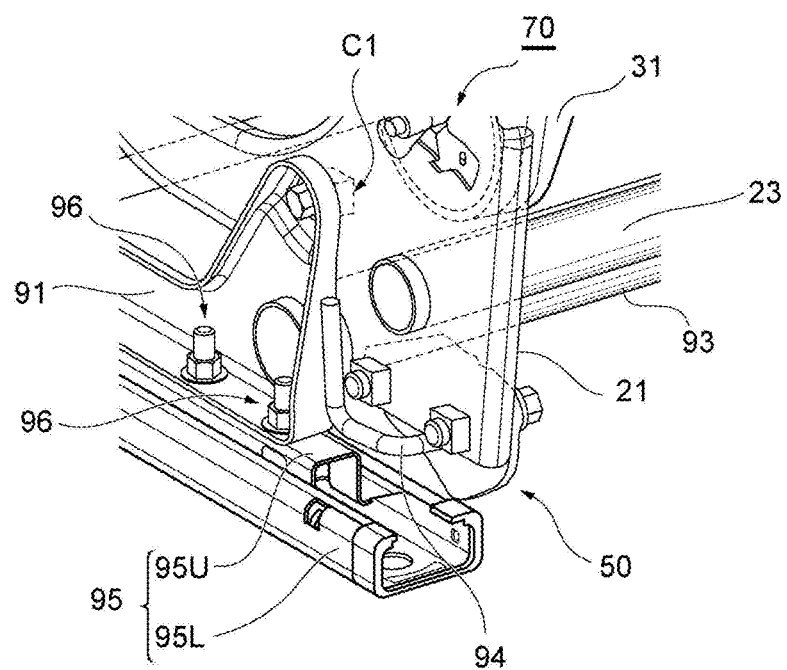
FIG. 13 is a perspective view showing a striker and its peripheral portion on an enlarged view.
Figure 14:
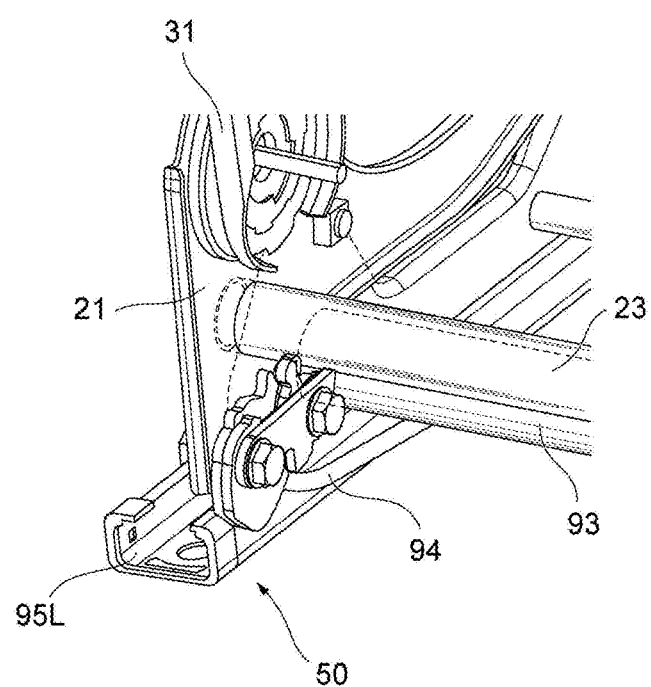
FIG. 14 is a perspective view from the inside of the vehicle seat showing a striker and its peripheral portion on an enlarged view.

In the locked state, the lock unit 50 engages the striker 94 with an engagement groove 52m of a cam 52 for locking (see FIG. 12). At this step, the vehicle seat 1 is held in a normal seated posture (see FIGS. 7, 9, and the like).

The vehicle seat 1 configured as described above is held in the locked state by the lock unit 50, and is in a seated posture in a normal time (see FIGS. 2, 3, 7, 9, 11, and the like). Further, the seat side releasing lever 61 is operated to release the locked state by the lock unit 50. This enables the pitching operation to be performed for achieving forward leaning, which enables the use of the walk-in function.

Further, with the vehicle seat 1 of the present embodiment, the connecting member 92 of the base frame 90 functions as a stopper for regulating the pitching operation region of the cushion frame 20 (see FIGS. 7, 8, and the like), and in addition, supports the main frame 10 in a forward leaning posture. The configuration in which supporting is thus accomplished by a structural material tends to provide the rigidity and the strength.

Figure 9:
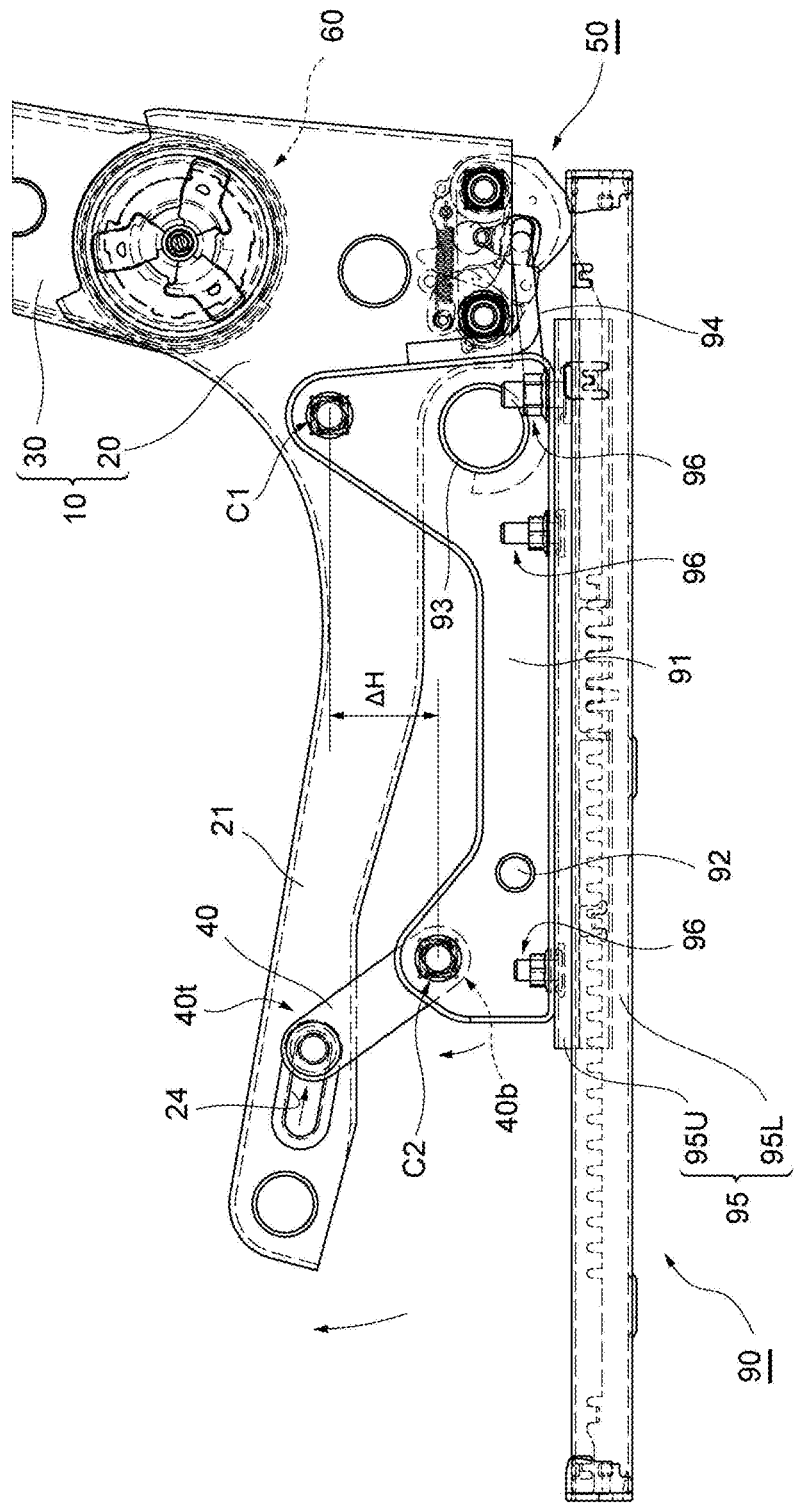
FIG. 9 is a left-hand side view showing the cushion frame, the base frame, and the like in a normal time (in sitting) on an enlarged scale.
Figure 10:
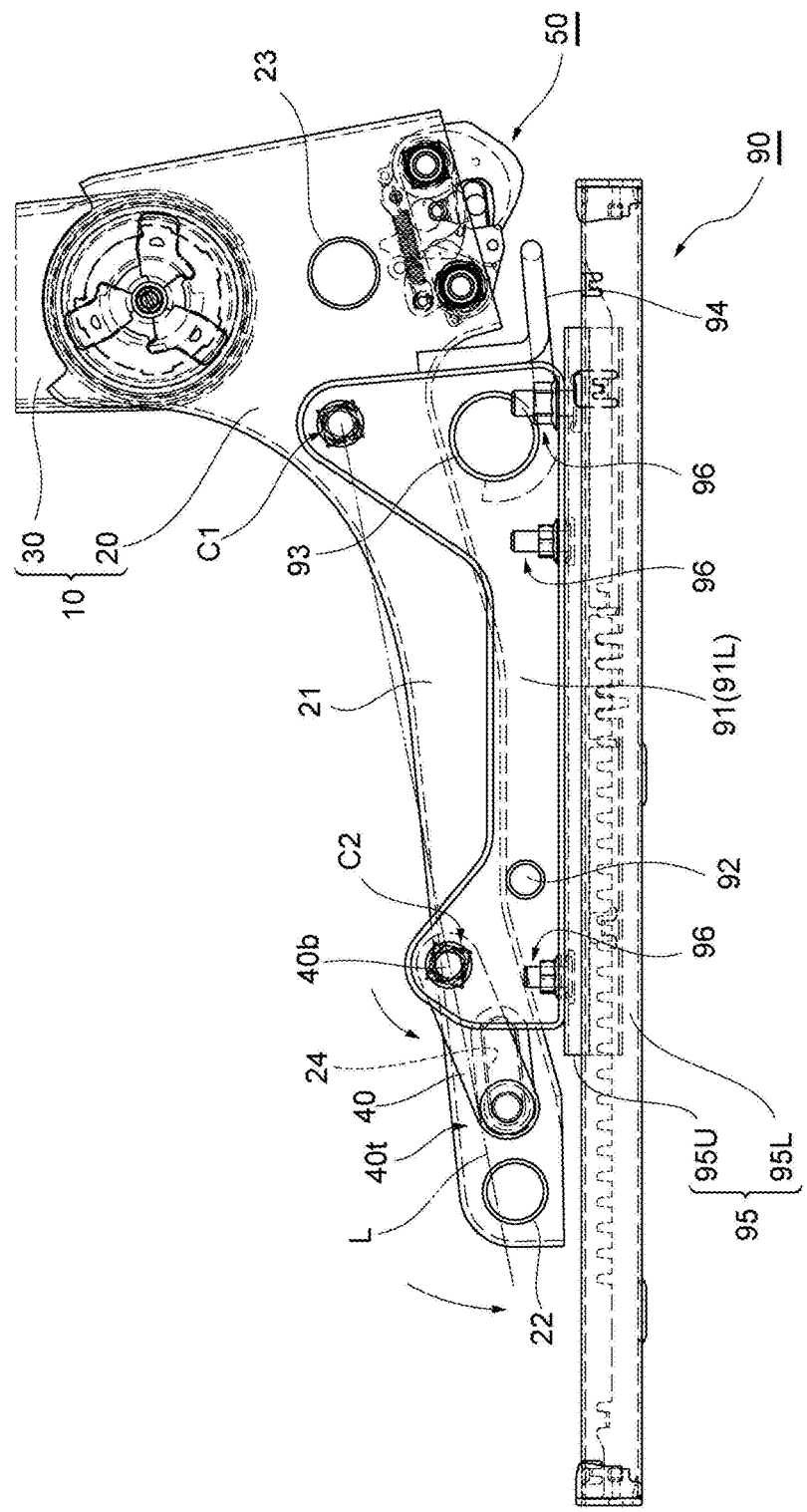
FIG. 10 is a left-hand side view showing the cushion frame, the base frame, and the like upon performing a forward pitching operation.
Figure 11:
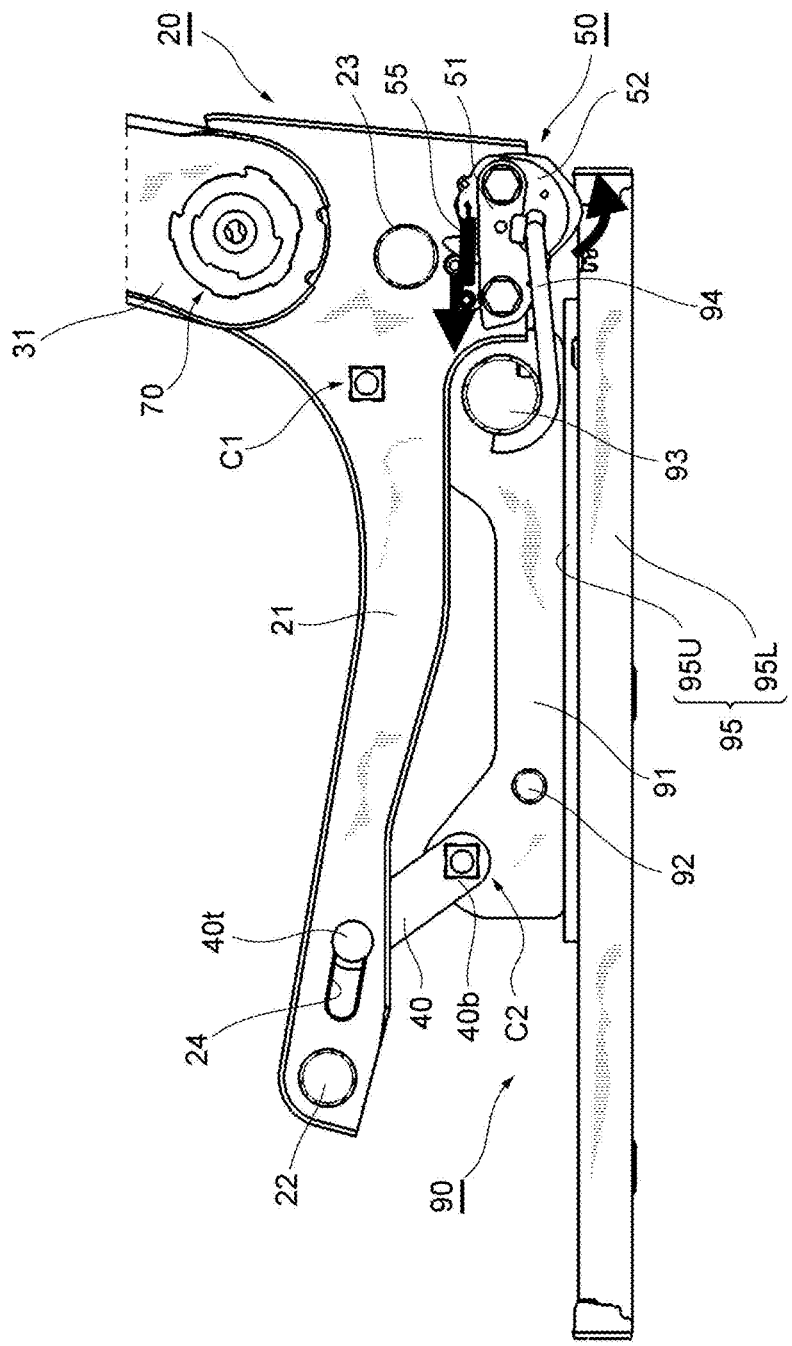
FIG. 11 is an enlarged view of the cushion frame, the base frame, and the like as viewed from the inside of the vehicle seat in a normal time (in sitting)

Herein, assuming a straight line L connecting the back connecting point (first connecting point) C1 and the front connecting point (second connecting point) C2 (see FIG. 10), with the vehicle seat 1 of the present embodiment, the distal end 40t (the tip of the front link 40 swinging about the front connecting point C2 as the center) situated on the upper side of the straight line L in a normal seated posture swings beyond the straight line L to a position on the lower side thereof in accordance with the pitching operation (see FIGS. 9, 10, and the like). The vehicle seat 1 of the present embodiment thus set so as to increase the swinging region of a part of the link (in the case of the present embodiment, the front link 40) provides the following advantage: the leaning angle of the seat back 3 is increased, thereby deepening the forward leaning posture, which makes it easier to ensure a wider space for walk-in.

Incidentally, although not particularly shown, contrary to the foregoing configuration, a structure can also be adopted in which the distal end 40t situated on the upper side of the straight line L in a normal seated posture does not cross the straight line L, and stops at the upper side thereof during the pitching operation. When such a structure is adopted, the operation is stopped before the resistance applied on the front link 40 by the long hole 24 during the pitching operation exceeds the maximum value, and hence the operability is good.

Further, with the vehicle seat 1 of the present embodiment, the back connecting point (first connecting point) C1 disposed at the base frame 90 is set at a higher position than the front connecting point (second connecting point) C2 similarly disposed at the base frame 90. In the case of such setting, the boarding/alighting space for the pitching operation tends to be ensured. Incidentally, an increase in difference ΔH in height in the vertical direction between the back connecting point C1 and the front connecting point C2 enables the range of the pitching operation to be set still larger. This can be appropriately set in consideration of the longitudinal distance between the back connecting point C1 and the front connecting point C2, the size of the base frame 90, the pitching operation of the vehicle seat required of the vehicle, and the like.

As described up to this point, the vehicle seat 1 of the present embodiment is configured to be capable of the pitching operation by a four-bar slider mechanism including only three members (the base frame 90, the cushion frame 20, and the front link 40), and the long hole 24. Such a mechanism has a smaller component count, and is more advantageous in weight and cost reduction than such a conventional four-link mechanism as to include, for example, a front link, a rear link, a base frame, and a main frame. Further, when the component count is higher, the strength or the rigidity becomes more likely to be reduced by that much. However, it can be said that the vehicle seat 1 adopting such a linkage mechanism as in the present embodiment is more likely to ensure the strength or the rigidity than a conventional vehicle seat including a conventional four-link mechanism.

Figure 16:
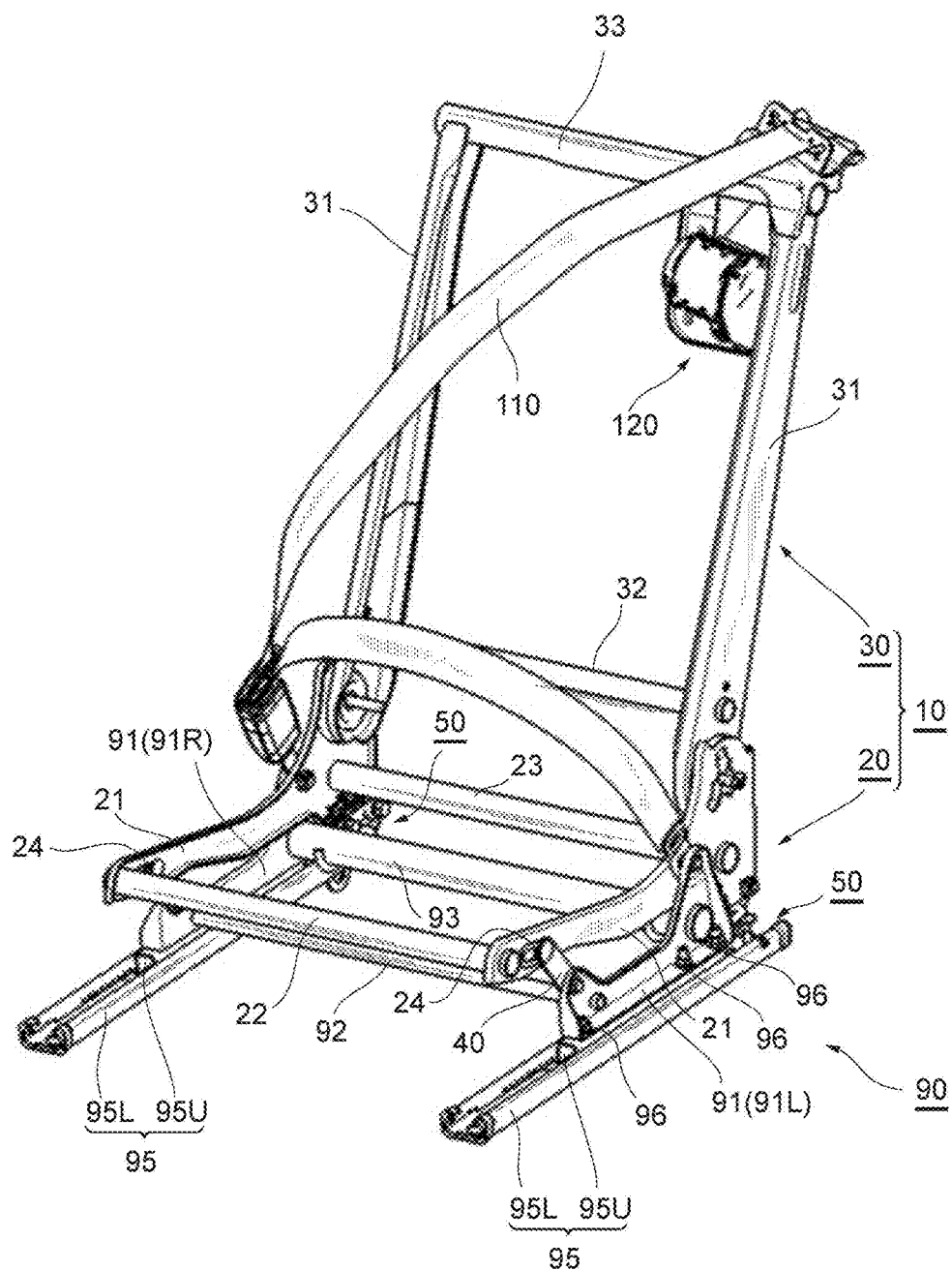
FIG. 16 is a perspective view showing an internal frame and the like of the vehicle seat in the other embodiment of the present disclosure.

Further, the vehicle seat 1 of the present embodiment excellent in rigidity is preferably applicable to a retractor-equipped type seat (belt-in seat). Namely, in the present embodiment, a mechanism (slider mechanism) which is more likely to ensure the strength or the rigidity than a conventional structure is adopted as described above. In addition to this, a structure is adopted in which the base frame 90 and the cushion frame 20 are locked by the lock unit 50 including a hook-shaped latch part 52r, or having other configurations, which readily provides the strength for locking. For this reason, the vehicle seat 1 which can withstand the impact upon vehicle collision tends to be formed. Therefore, the vehicle seat 1 of the present embodiment is preferably applicable to a retractor-equipped type seat required to have a relatively higher impact resistant performance (see FIGS. 15 and 16). Incidentally, in FIGS. 15 and 16, a seat belt is indicated with a reference numeral 110, and a retractor is indicated with a reference numeral 120.

Second Embodiment

Subsequently, another preferable embodiment of the vehicle seat in accordance with the present disclosure will be described as second embodiment (see FIGS. 17 to 28). Incidentally, below, mainly, a description will be given to a different configuration from that of the vehicle seat described in the first embodiment.

The vehicle seat 1 of the present embodiment includes a base frame 90, a main frame 10, a front link 40, a lock unit 50, a lock release member 60, and the like.

Figure 17:
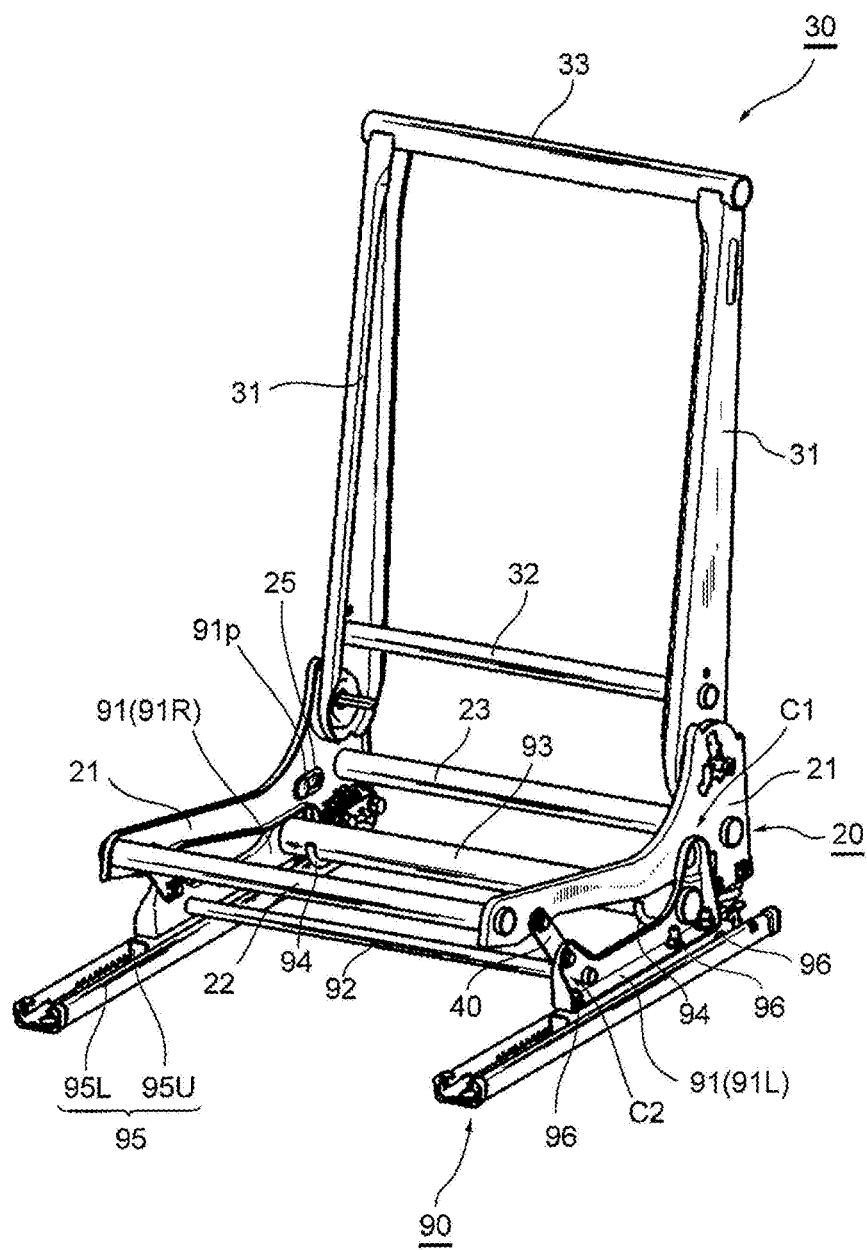
FIG. 17 is a perspective view showing an overall configuration of an internal frame, and the like forming a vehicle seat.
Figure 18:
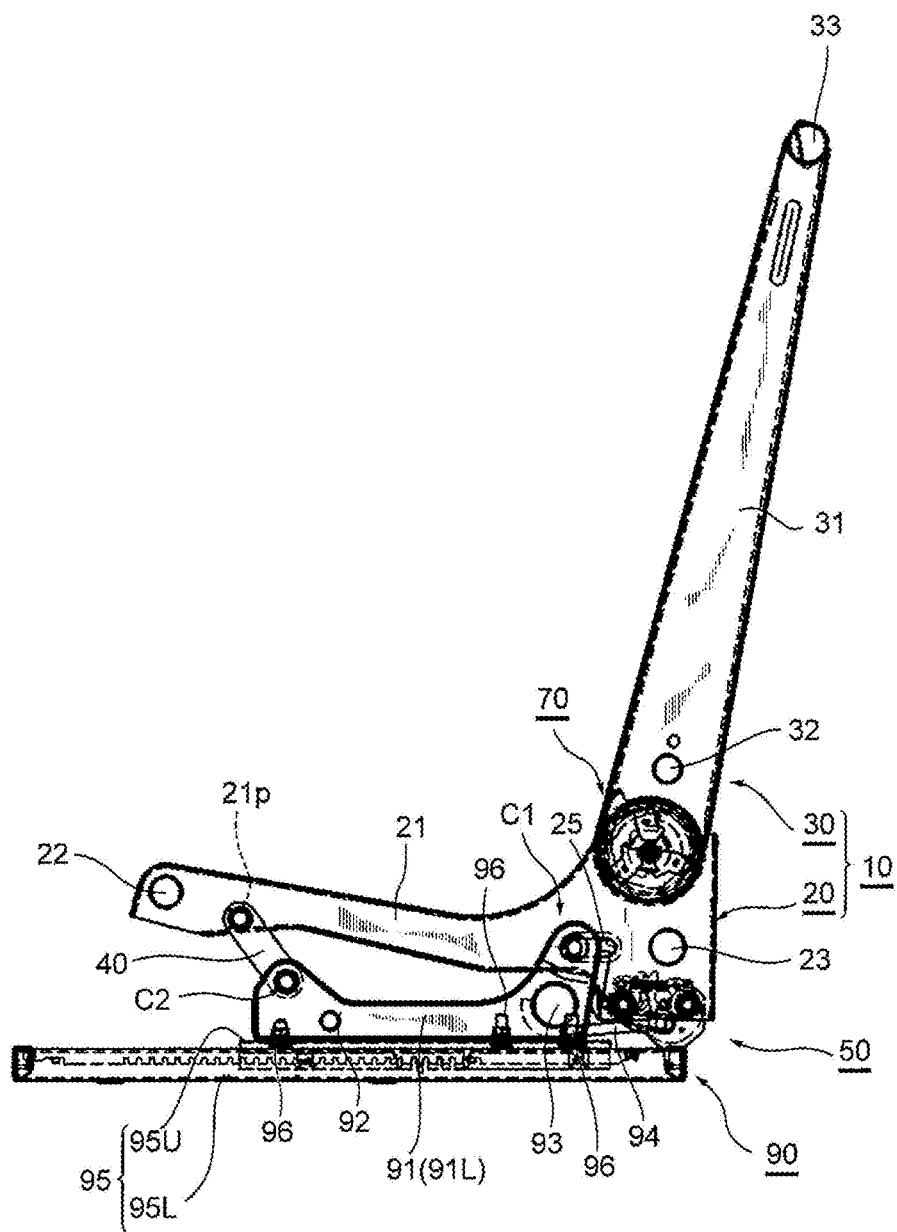
FIG. 18 is a left-hand side view showing an overall configuration of an internal frame, and the like forming the vehicle seat.
Figure 19:
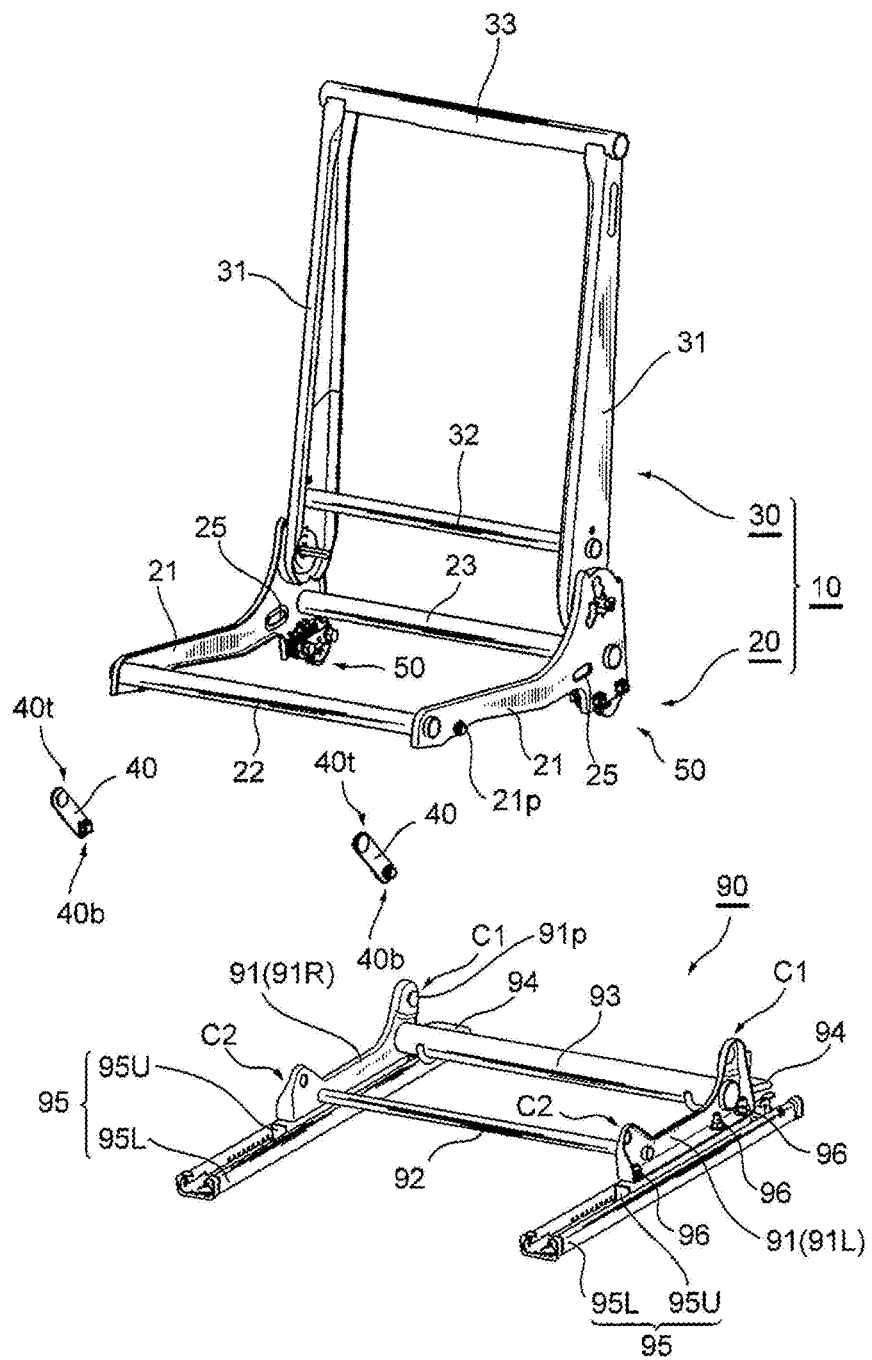
FIG. 19 is an exploded perspective view of an internal frame, and the like forming the vehicle seat.
Figure 20:
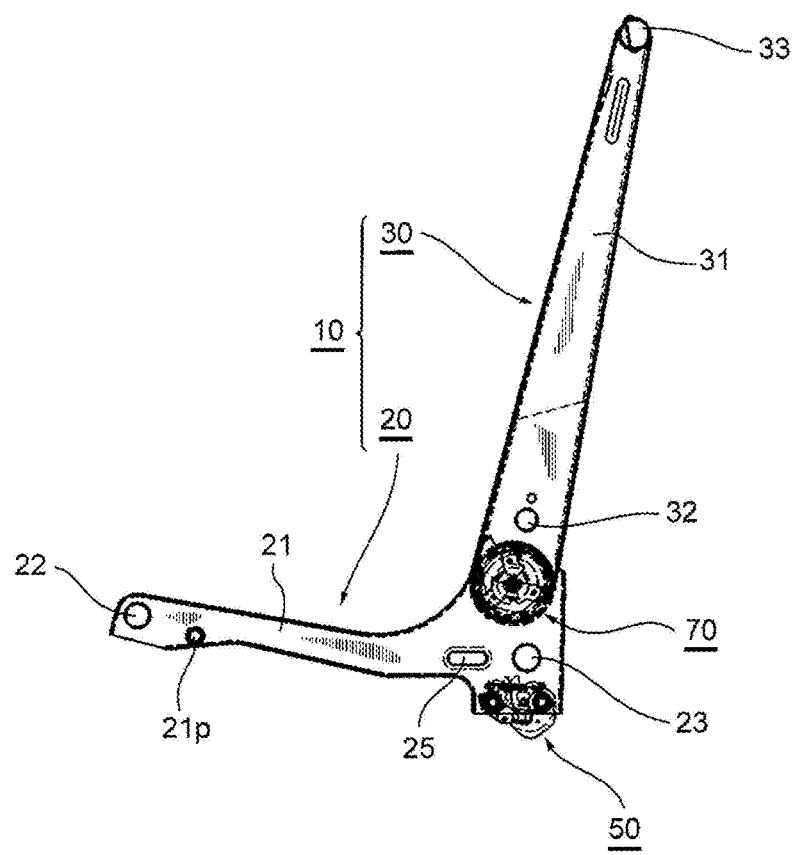
FIG. 20 is a left-hand side view showing an internal main frame (cushion frame and back frame) forming the vehicle seat.
Figure 21:
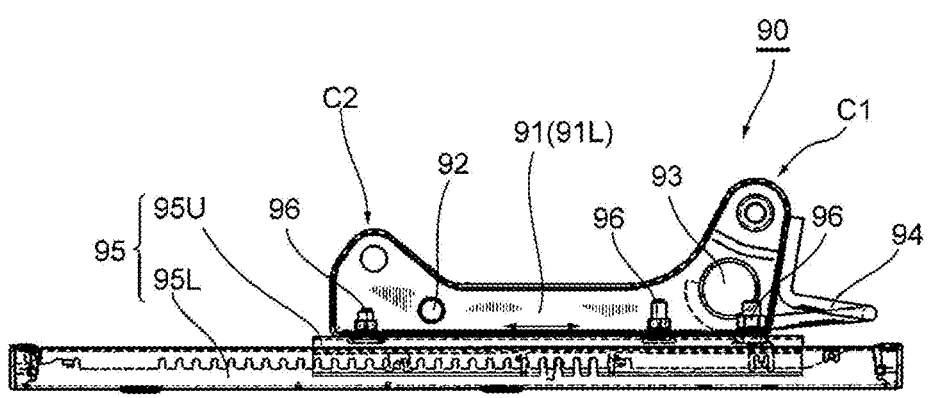
FIG. 21 is a left-hand side view showing internal base frame and slide rail forming the vehicle seat.
Figure 22:
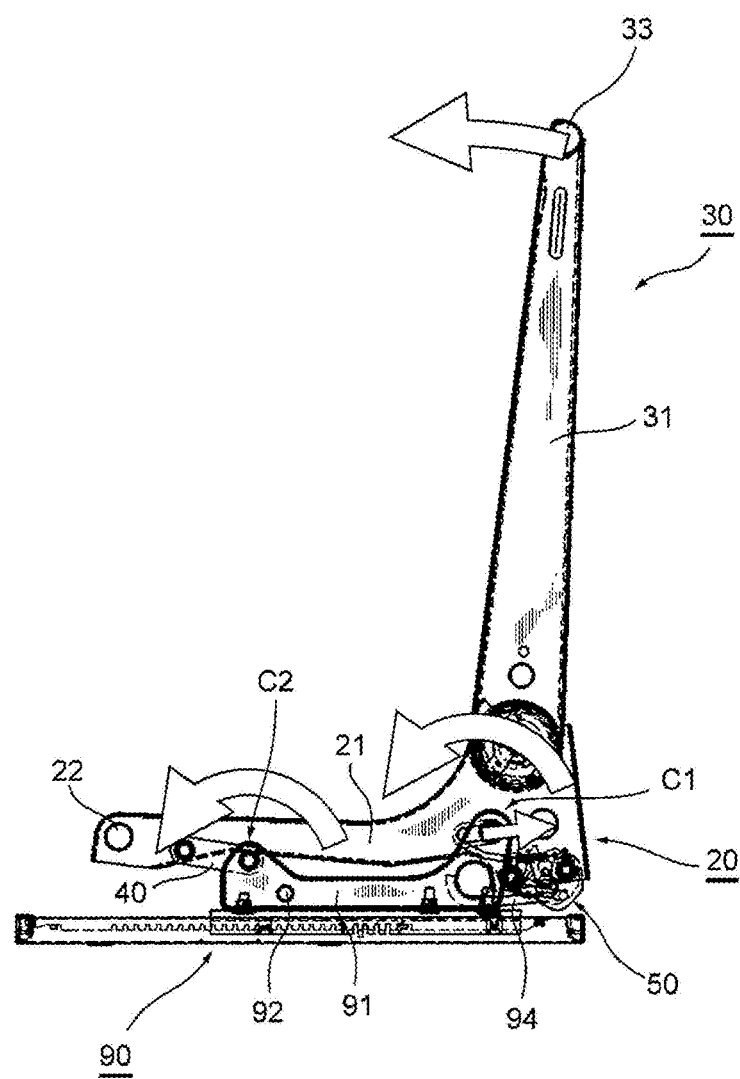
FIG. 22 is a left-hand side view showing a state of the overall frame in a normal time (in sitting)
Figure 23:
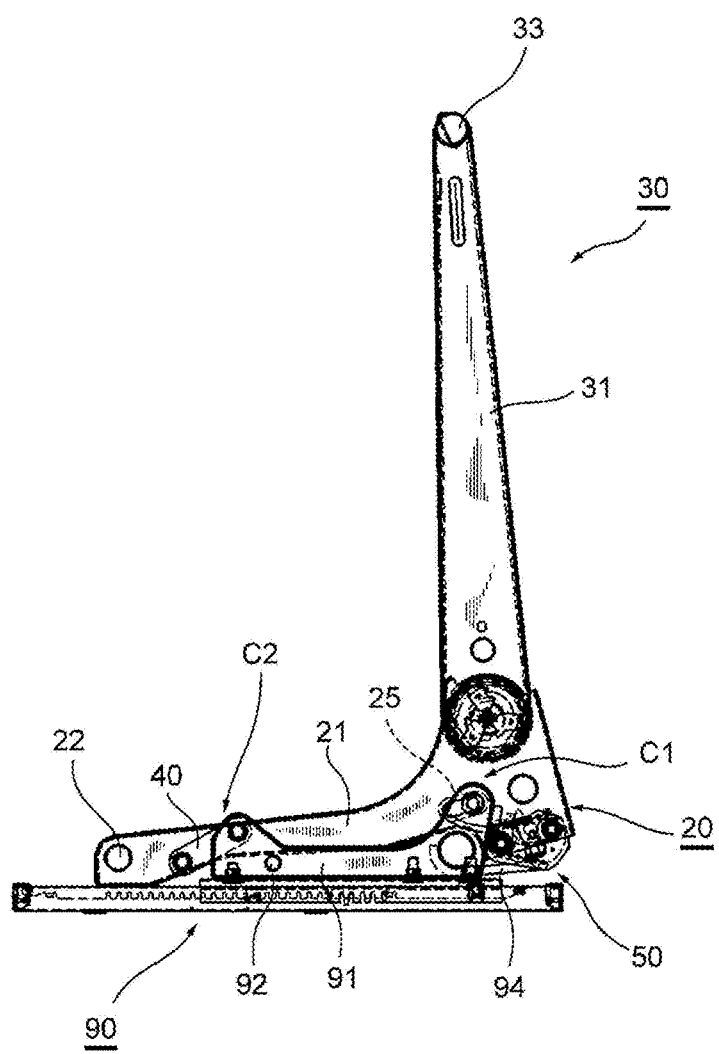
FIG. 23 is a left-hand side view showing a state of the overall frame upon performing a forward pitching operation.

The base frame 90 is a frame mounted at the floor part of a vehicle compartment, and including the main frame 10 mounted thereon (see FIG. 17, and the like). The base frame 90 of the present embodiment includes a riser 91, connecting members 92 and 93, a striker 94, and a slide rail 95.

The riser 91 includes a pair of left and right members forming the frames on the opposite sides of the base frame 90. To a back connecting point (first connecting point) C1 of each of the pair of risers 91 (91L and 91R), (the cushion frame 20 forming a part of) the main frame 10 is connected swingably and slidably in the forward/backward direction. Further, to a front connecting point (second connecting point) C2 of each risers 91, the front link 40 is pin-connected swingably in the forward/backward direction (see FIG. 18 or the like). The pair of left and right risers 91 are fastened to left and right upper rails 95U by fasteners 96 including, for example, a bolt/nut, respectively (see FIG. 18, or the like), and can slide back and forth along the lower rails 95L (see FIG. 19, or the like). In the present embodiment, the riser 91 is mounted at a position such that the front end and the rear end of the upper rail 95U each protrude from the riser 91 (see FIG. 21, or the like).

Further, to the front connecting point (second connecting point) C2 of each riser 91 forming the base frame 90, the front link 40 is pin-connected, and is swingably supported, and the cushion frame 20 is pin-connected to the distal end 40t of the front link 40. Further, a long hole 25 extending in the forward/backward direction is provided at the rear part (e.g., around a little in front of the portion at which the connecting member 23 is mounted) of the frame side part 21 (see FIG. 20 or the like). To the long hole 25, a pin 91p disposed at the riser 91 of the base frame 90 is slidably mounted (see FIG. 24, or the like). The long hole 25 shown in the present embodiment has a linearly extending shape (generally rectangular shape), and, other than this, may also have a circular arc shape curving along an arc, or the like.

The front links 40 are a pair of left and right members forming a four-bar slider mechanism for enabling the pitching operation of the main frame (the cushion frame 20 and the back frame 30) 10 (see FIG. 17, or the like). The front link 40 is pin-connected, and is supported swingably at the proximal end 40b side to the front connecting point (second connecting point) C2 of the riser 91 forming the base frame 90. The distal end 40t side of the front link 40 is pin-connected using, for example, a pin 21p disposed at the frame side part 21 of the cushion frame 20 (see FIG. 18, or the like).

Subsequently, the operation of the lock unit 50 will be described in brief with reference to the accompanying drawings (see FIG. 27, or the like), and in addition, the posture of the vehicle seat 1 will also be described.

Figure 27:
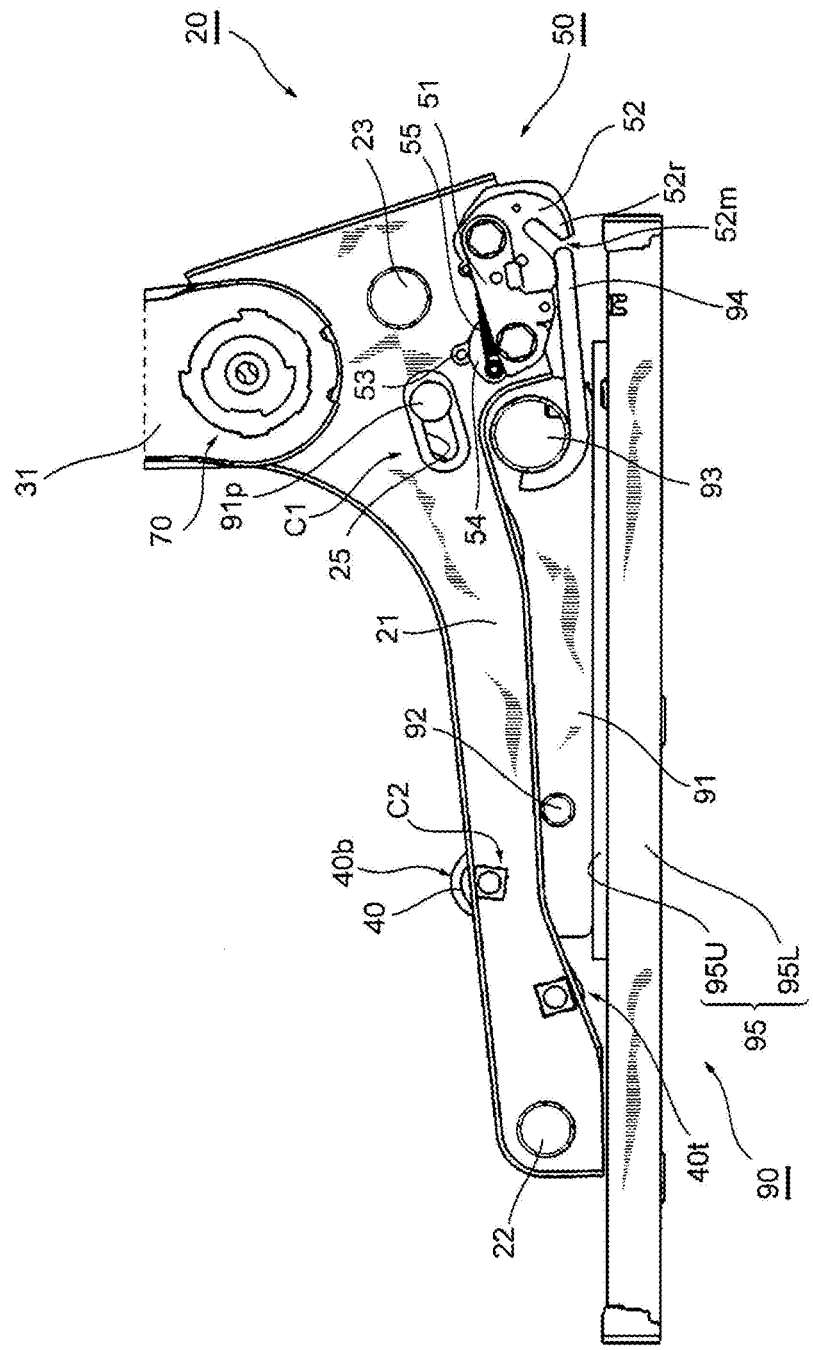
FIG. 27 is an enlarged view of the cushion frame, the base frame, and the like as viewed from the inside of the vehicle seat upon performing a forward pitching operation.
Figure 28:
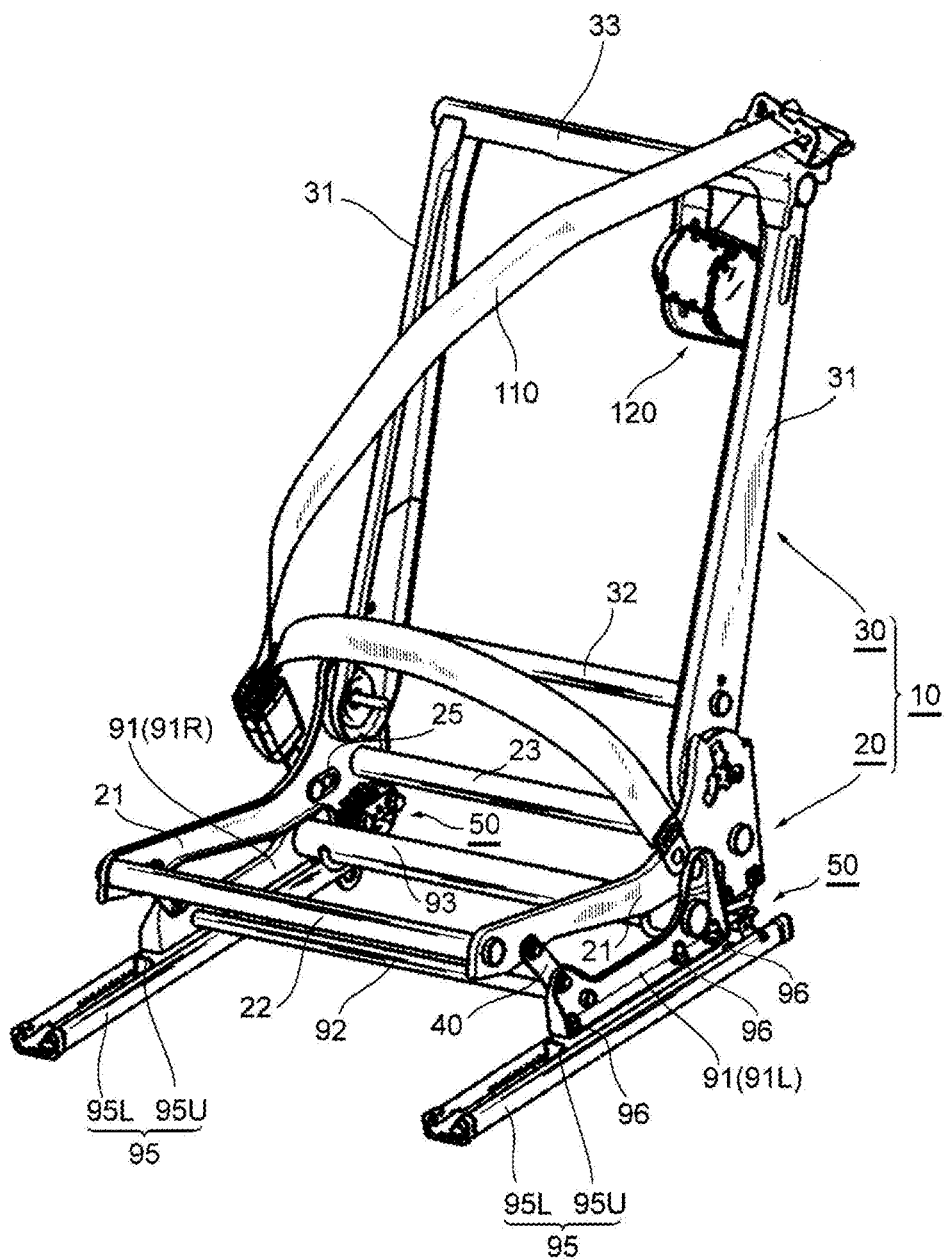
FIG. 28 is a perspective view showing an internal frame, and the like of a vehicle seat in another embodiment of the present disclosure.

In the locked state, the lock unit 50 engages the striker 94 with an engagement groove 52m of a cam 52 for locking (see FIG. 27). At this step, the vehicle seat 1 is held in a normal seated posture (see FIGS. 22, 24, and the like).

The vehicle seat 1 configured as described above is held in the locked state by the lock unit 50, and is in a seated posture in a normal time (see FIGS. 17, 18, 22, 24, 26, and the like). Further, the seat side releasing lever 61 is operated to release the locked state by the lock unit 50. This enables the pitching operation to be performed for achieving forward leaning, which enables the use of the walk-in function.

Further, with the vehicle seat 1 of the present embodiment, the connecting member 92 of the base frame 90 functions as a stopper for regulating the pitching operation region of the cushion frame 20 (see FIGS. 22, 23, and the like), and in addition, supports the main frame 10 in a forward leaning posture. The configuration in which supporting is thus accomplished by a structural material tends to provide the rigidity and the strength.

Figure 24:
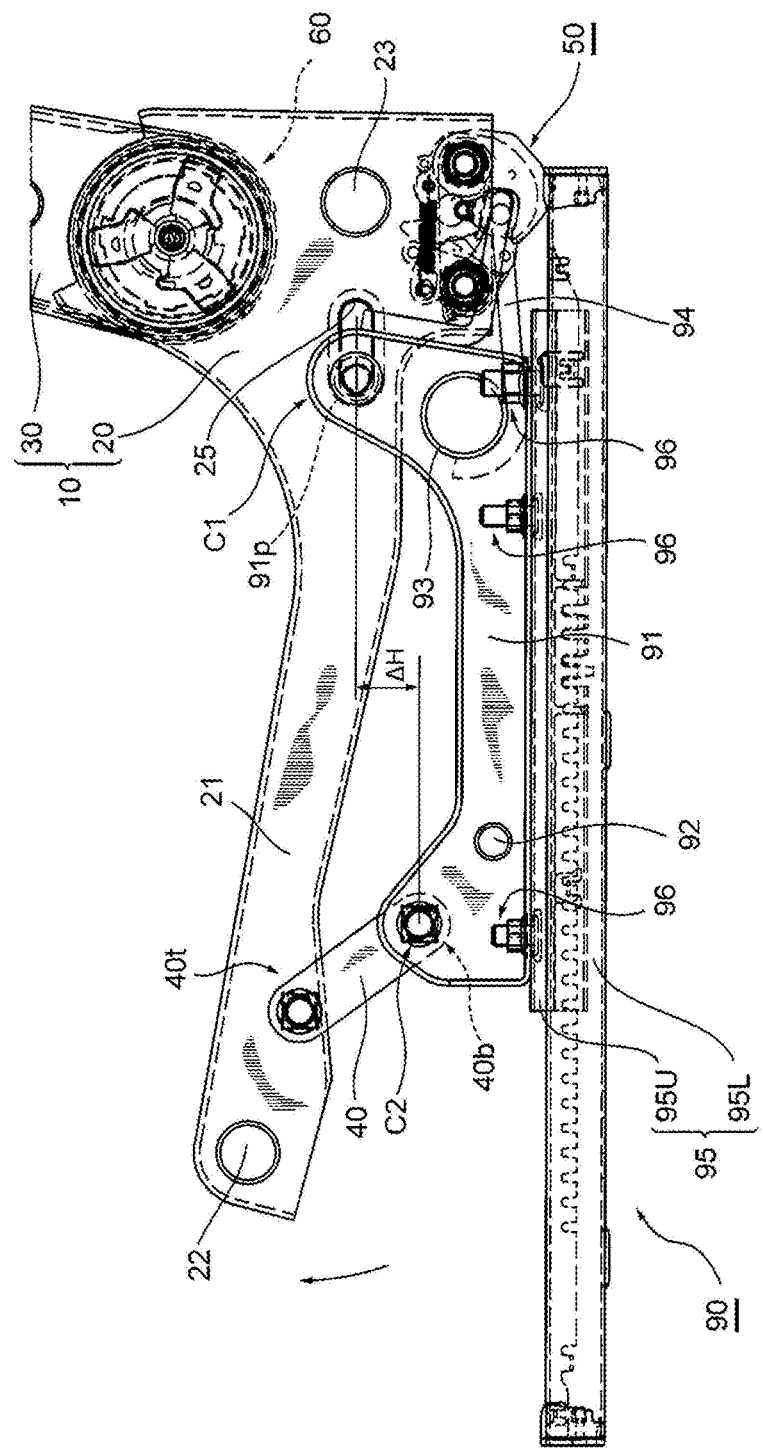
FIG. 24 is a left-hand side view showing the cushion frame, the base frame, and the like in a normal time (in sitting) on an enlarged scale.
Figure 25:
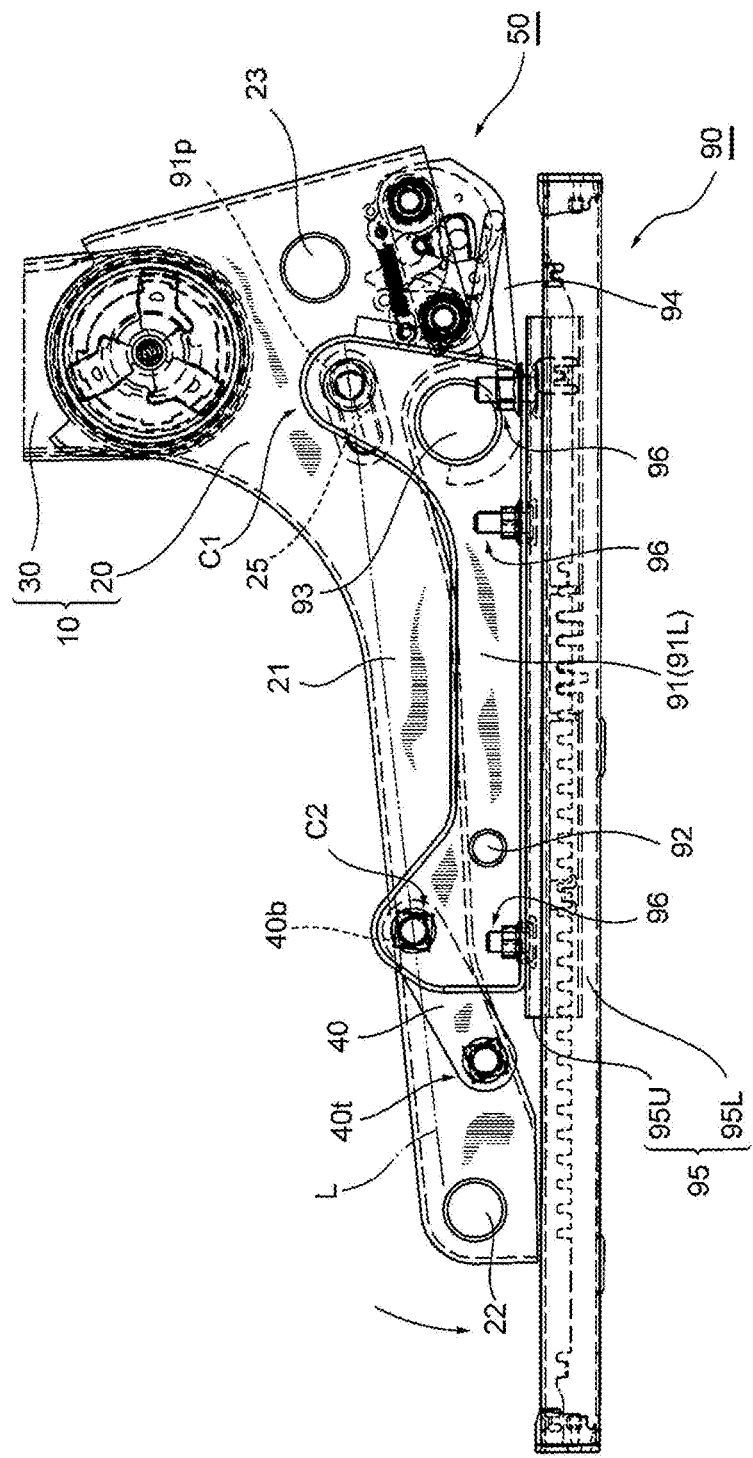
FIG. 25 is a left-hand side view showing the cushion frame, the base frame, and the like upon performing a forward pitching operation on an enlarged scale.
Figure 26:
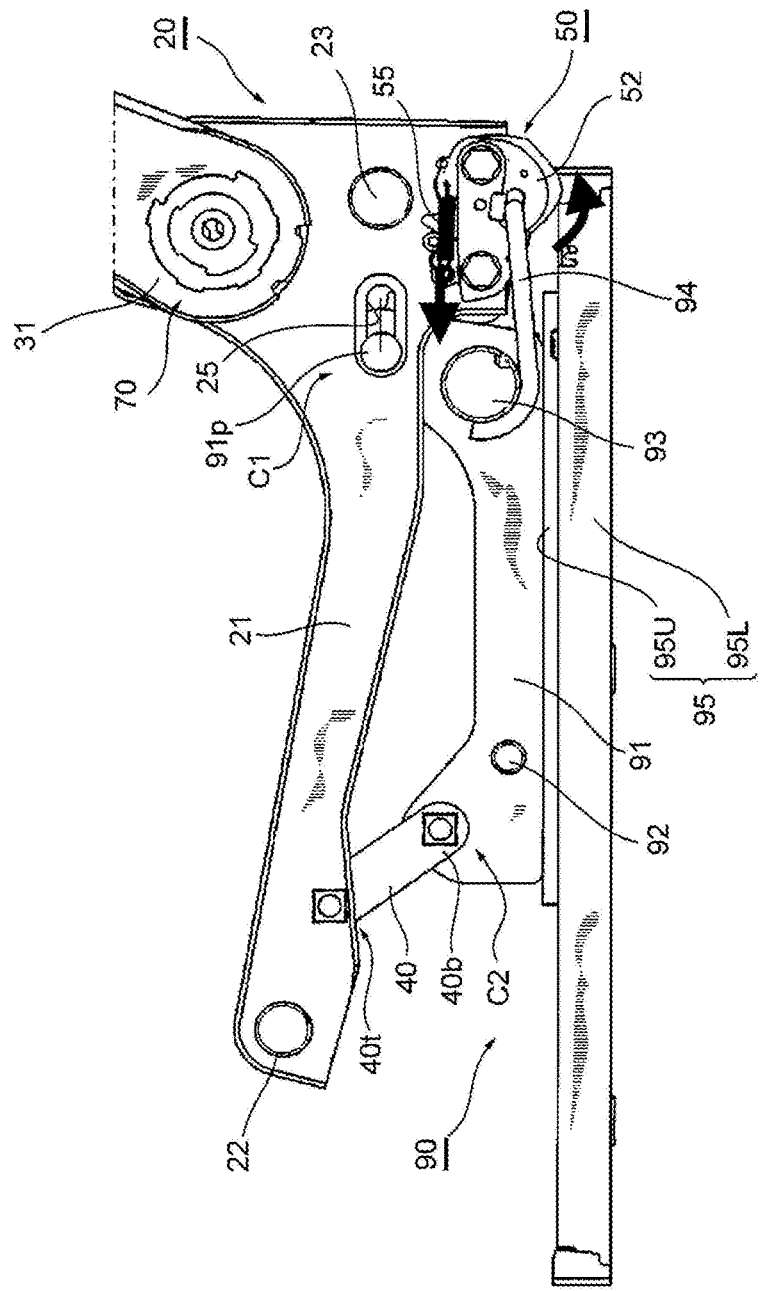
FIG. 26 is an enlarged view of the cushion frame, the base frame, and the like as viewed from the inside of the vehicle seat in a normal time (in sitting)

Herein, assuming a straight line L connecting the back connecting point (first connecting point) C1 and the front connecting point (second connecting point) C2 (see FIG. 25), with the vehicle seat 1 of the present embodiment, the distal end 40t (the tip of the front link 40 swinging about the front connecting point C2 as the center) situated on the upper side of the straight line L in a normal seated posture swings beyond the straight line L to a position on the lower side thereof in accordance with the pitching operation (see FIGS. 24, 25, and the like). The vehicle seat 1 of the present embodiment thus set so as to increase the swinging region of a part of the link (in the case of the present embodiment, the front link 40) provides the following advantage: the leaning angle of the seat back 3 is increased, thereby deepening the forward leaning posture, which makes it easier to ensure a wider space for walk-in.

Incidentally, although not particularly shown, contrary to the foregoing configuration, a structure can also be adopted in which the distal end 40t situated on the upper side of the straight line L in a normal seated posture does not cross the straight line L, and stops at the upper side thereof during the pitching operation. When such a structure is adopted, the operation is stopped before the resistance applied on the pin 91p of the base frame 90 by the long hole 25 during the pitching operation exceeds the maximum value, and hence the operability is good.

As described up to this point, the vehicle seat 1 of the present embodiment is configured to be capable of the pitching operation by a four-bar slider mechanism including only three members (the base frame 90, the cushion frame 20, and the front link 40), and the long hole 25. Such a mechanism has a smaller component count, and is more advantageous in weight and cost reduction than such a conventional four link mechanism as to include, for example, a front link, a rear link, a base frame, and a main frame. Further, when the component count is higher, the strength or the rigidity becomes more likely to be reduced by that much. However, the vehicle seat 1 adopting such a linkage mechanism as in the present embodiment is more likely to ensure the strength or the rigidity than a vehicle seat including a conventional four link mechanism.

Further, the vehicle seat 1 of the present embodiment excellent in rigidity is preferably applicable to a retractor-equipped type seat (belt-in seat). Namely, in the present embodiment, a mechanism (slider mechanism) which is more likely to ensure the strength or the rigidity than a conventional structure is adopted as described above. In addition to this, a structure is adopted in which the base frame 90 and the cushion frame 20 are locked by the lock unit 50 including a hook-shaped latch part 52r, or having other configurations, which readily provides the strength for locking. For this reason, the vehicle seat 1 which can withstand the impact upon vehicle collision tends to be formed. Therefore, the vehicle seat 1 of the present embodiment is preferably applicable to a retractor-equipped type seat required to have a relatively higher impact resistant performance (see FIG. 28). Incidentally, in FIG. 28, a seat belt is indicated with a reference numeral 110, and a retractor is indicated with a reference numeral 120.

Incidentally, the embodiments are examples of preferable embodiments of the present disclosure, but are not exclusive, and can be variously modified within the scope not departing from the gist of the present disclosure to be executed. For example, the form of the lock using the lock unit 50 is preferably the one for directly locking the base frame 90 and the cushion frame 20, or may be the one for indirectly locking these. Namely, even the form for locking the striker 94 fixed to the base frame 90 as in the present embodiment can provide necessary and sufficient locking strength, and impact resistant performance. Therefore, a structure for directly locking the base frame 90 and the cushion frame 20 tends to provide still higher locking strength, and impact resistant performance.

Further, the locking structure in the lock unit 50 is not limited to the structure as described above (lock & striker), and may naturally be others. Although not particularly shown, adoption of a locking structure using, for example, a motor also enables adaptation to a power seat (electrically adjustable seat).

Further, in the present embodiment, the connecting member 92 is used as a stopper for regulating the range in which the cushion frame 20 can lean, which is merely one example of the member functioning as a stopper. Although not particularly shown, other than this, for example, a bracket for a stopper, or a pin can be set to function as a stopper.

The present disclosure is preferably applicable to a vehicle seat having a pitching mechanism.

What is claimed is:

1. A vehicle seat, comprising:
a base frame mounted in a vehicle compartment;
a main frame including a cushion frame pin-connected to a first connecting point of the base frame to be capable of a forward leaning operation and forming a frame of a seat, a back frame disposed to be capable of a reclining operation of reclining with respect to the cushion frame by a reclining mechanism and forming a frame of a backrest, a lock unit provided to lock the cushion frame to the base frame at a seated position and regulate a pitching operation of the cushion frame and the back frame, and a release member provided to release a locked state established by the lock unit, the main frame being configured to assume a forward leaning posture by the pitching operation from a seated posture; and
a front link swingably pin-connected at a proximal end side of the front-link swingably pin with a second connecting point of the base frame and slidably connected at a distal end side of the front link swingably pin with the cushion frame; wherein a stopper is disposed at a position such that the movable range of the cushion frame is regulated at a point at which the distal end of the front link crosses a straight line connecting the first connecting point and the second connecting point.

2. The vehicle seat according to claim 1, wherein a long hole, to which the front link is slidably connected, is formed in the cushion frame.

3. The vehicle seat according to claim 2, wherein a stopper configured to regulate a movable range of the cushion frame is disposed at the base frame.

4. The vehicle seat according to claim 1, wherein the cushion frame is arranged on an inner side of the base frame.

5. The vehicle seat according to claim 1, wherein the first connecting point of the base frame is set upward of the second connecting point.

6. The vehicle seat according to claim 1, wherein the lock unit is arranged at a position rearward and downward of the first connecting point.

7. The vehicle seat according to claim 1, further comprising a slide rail configured to support the base frame slidably in a forward/backward direction.

8. The vehicle seat according to claim 7, wherein an upper rail configured to form the slide rail is longer than a longitudinal length of the base frame.

9. A vehicle seat, comprising:
a base frame mounted in a vehicle compartment;
a main frame including a cushion frame connected to a first connecting point of the base frame to be capable of a forward leaning operation and slidably with respect to the base frame and moreover forming a frame of a seat, a back frame to be capable of a reclining operation of reclining with respect to the cushion frame by a reclining mechanism and forming a frame of a backrest, a lock unit provided to lock the cushion frame to the base frame at a seated position and regulating a pitching operation of the cushion frame and the back frame, and a release member provided to release a locked state established by the lock unit, the main frame being configured to assume a forward leaning posture by the pitching operation from a seated posture; and
a front link swingably pin-connected at a proximal end side of the front link swingably pin with a second connecting point of the base frame and swingably connected at a distal end side of the front link swingably pin with the cushion frame; wherein a stopper configured to regulate a movable range of the cushion frame is disposed at the base frame,
wherein a long hole configured to slidably connect the cushion frame to the base frame is formed in the cushion frame.

10. The vehicle seat according to claim 9, wherein a stopper is disposed at a position such that the movable range of the cushion frame is regulated within a range in which the distal end of the front link does not cross a straight line connecting the first connecting point and the second connecting point.

11. The vehicle seat according to claim 9, wherein a stopper is disposed at a position such that the movable range of the cushion frame is regulated at a point at which the distal end of the front link crosses a straight line connecting the first connecting point and the second connecting point.

12. The vehicle seat according to claim 9, wherein the cushion frame is arranged on an inner side of the base frame.

13. The vehicle seat according to claim 9, wherein the first connecting point of the base frame is set upward of the second connecting point.

14. The vehicle seat according to claim 9, wherein the lock unit is arranged at a position rearward and downward of the first connecting point.

15. The vehicle seat according to claim 1, further comprising a slide rail configured to support the base frame slidably in a forward/backward direction.

16. The vehicle seat according to claim 15, wherein an upper rail configured to form the slide rail is longer than a longitudinal length of the base frame.

* * * * *